(12) United States Patent
Laplant et al.

(10) Patent No.: US 11,440,246 B1
(45) Date of Patent: Sep. 13, 2022

(54) METHODS AND SYSTEMS FOR INSPECTING HIERARCHICAL POWDERS AND VERIFYING THE FUNCTIONALIZATION OF POWDER SURFACES

(71) Applicant: HRL Laboratories, LLC, Malibu, CA (US)

(72) Inventors: Darby Laplant, Santa Monica, CA (US); John H. Martin, Oxnard, CA (US); Jacob Hundley, Thousand Oaks, CA (US); Julie Miller, Los Angeles, CA (US); Zak Eckel, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 32 days.

(21) Appl. No.: 17/121,627

(22) Filed: Dec. 14, 2020

Related U.S. Application Data

(60) Provisional application No. 62/976,711, filed on Feb. 14, 2020.

(51) Int. Cl.
*B29C 64/153* (2017.01)
*B22F 10/34* (2021.01)
*B22F 1/17* (2022.01)
*B22F 1/054* (2022.01)

(52) U.S. Cl.
CPC ............ *B29C 64/153* (2017.08); *B22F 1/054* (2022.01); *B22F 1/17* (2022.01); *B22F 10/34* (2021.01); *B22F 2999/00* (2013.01)

(58) Field of Classification Search
CPC ............... B29C 64/153; B22F 10/34
USPC .......................................................... 419/23
See application file for complete search history.

(56) References Cited

PUBLICATIONS

Kim et al., "Validation of Size Estimation of Nanoparticle Tracking Analysis on Polydisperse Macromolecule Assembly" Scientific Reports (Feb. 25, 2019) 9:2639.
Lin et al., "Aluminum with dispersed nanoparticles by laser additive manufacturing" Nature Communications (Sep. 11, 2019) 10:4124.
Malvern white paper, "A basic guide to particle characterization" (2015), Malvern Instruments Limited.

*Primary Examiner* — Weiping Zhu
(74) *Attorney, Agent, or Firm* — O'Connor & Company; Ryan P. O'Connor

(57) ABSTRACT

The present disclosure provides a methodology in which nanoparticle-coated microparticles are rapidly quality-checked for verification of surface functionalization of a commercial quantities of hierarchical powder. Some variations provide a method for inspecting surface-functionalized microparticles, comprising: selecting samples of hierarchical powders comprising microparticles and surface-coated nanoparticles; subjecting the hierarchical powders to a sample particle-size measurement; comparing the sample particle-size measurement to a baseline measurement; and determining the relative concentration of free nanoparticles, based on particle-size distributions. If the sample particle-size measurement is statistically equivalent to the baseline measurement, that is verification of complete surface functionalization. If the sample particle-size measurement is statistically different than the baseline measurement, then the baseline measurement is subtracted from the sample particle-size measurement, to determine the content of free nanoparticles. Optionally, the surface-coated nanoparticles are removed from the sample and additional particle-size distributions measured, to determine the content of original surface-coated nanoparticles, for additional quality control.

20 Claims, 11 Drawing Sheets

METHODS AND SYSTEMS FOR INSPECTING HIERARCHICAL POWDERS AND VERIFYING THE FUNCTIONALIZATION OF POWDER SURFACES

PRIORITY DATA

This patent application is a non-provisional application with priority to U.S. Provisional Patent App. No. 62/976,711, filed on Feb. 14, 2020, which is hereby incorporated by reference herein.

FIELD OF THE INVENTION

The present invention generally relates to methods of verifying the surface functionalization of metal powders for additive manufacturing or other processes.

BACKGROUND OF THE INVENTION

The assembly of nanoparticles onto substrates is relevant for a wide variety of applications, including metal-based additive manufacturing utilizing surface-functionalized metal alloys, for example. HRL Laboratories, LLC (Malibu, Calif., USA) has developed breakthrough technology for metal alloys that are functionalized with nanoparticles on surfaces of microparticles. See, for example, U.S. Pat. No. 9,738,788, issued on Aug. 22, 2017; U.S. Pat. No. 9,994,445, issued on Jun. 12, 2018; U.S. Pat. No. 10,030,292, issued on Jul. 24, 2018; U.S. Pat. No. 10,648,082, issued on May 12, 2020; and U.S. Pat. No. 10,682,699, issued on Jun. 16, 2020, which are hereby incorporated by reference.

There exists a need for a rapid, accurate, and large-volume method of determining the amount and coverage of nanoparticles deposited on the surface of the microparticles. In particular, there is a desire to be able to evaluate the effectiveness of the deposition of surface particles within hierarchical particle assemblies. Additionally, to increase the yield and decrease the cost in high-volume production of these materials, it is desirable to ensure that all or nearly all nanoparticles are assembled onto the hierarchical powders and not discarded as excess and/or present as free particulates in the product.

Current methods described in the literature include localized analytical chemistry or microscopy techniques such as scanning electron microscopy (SEM), X-ray photoelectron spectroscopy (XPS), X-ray florescence (XRF), and energy-dispersive spectroscopy (EDS). Each of these techniques is isolated to a local area (single particulates or small amounts of powder) that may not be representative of the bulk product. Furthermore, each of these techniques requires extensive and time-consuming sample preparation and data analysis. As such, these methods cannot be used for in-line quality analysis of large amounts of powder. When an analytical technique is localized to only micrograms or milligrams of powder, the measurement may not accurately reflect the true properties of the material overall. In addition, limited sample size and severe preparation requirements mean that conventional methods may fail to detect residual nanoparticle content since free nanoparticles can be lost or damaged during preparation of the test sample.

In view of the aforementioned needs in the art, there is a need for a rapid characterization technique that can be applied for statistically significant quality assurance of commercial quantities (e.g., 0.1-1000 kg) of surface-functionalized metal alloys and other hierarchical powders, to verify surface functionalization.

SUMMARY OF THE INVENTION

The present invention addresses the aforementioned needs in the art, as will now be summarized and then further described in detail below.

Some variations provide a method for inspecting surface-functionalized microparticles, the method comprising:

(a) selecting at least one sample of hierarchical particle assemblies comprising microparticles and surface-coated nanoparticles, wherein the surface-coated nanoparticles are chemically and/or physically attached to the microparticles, and wherein, when surface functionalization is not complete, the sample further comprises free nanoparticles that are not chemically or physically attached to the microparticles;

(b) obtaining a baseline particle-size measurement of nanoparticle-free microparticles, thereby providing a microparticle particle-size distribution;

(c) subjecting the hierarchical particle assemblies to a sample particle-size measurement, thereby providing a sample particle-size distribution;

(d) comparing the sample particle-size measurement to the baseline particle-size measurement;

(e) if the sample particle-size measurement is statistically equivalent to the baseline particle-size measurement, then providing verification that there is complete surface functionalization due to the absence of the free nanoparticles;

(f) if the sample particle-size measurement is statistically different than the baseline particle-size measurement, then subtracting the baseline particle-size measurement from the sample particle-size measurement, to calculate a free-nanoparticle particle-size distribution; and (g) determining the relative concentration of the free nanoparticles within the sample, based at least on the free-nanoparticle particle-size distribution.

In some embodiments, the sample particle-size measurement and the baseline particle-size measurement utilize a particle-size measurement technique selected from the group consisting of laser diffraction, dynamic light scattering, diffusing wave spectroscopy, static optical imaging, and dynamic optical imaging. In certain embodiments, the particle-size measurement technique is laser diffraction.

In step (b), the microparticle particle-size distribution may be measured or may be provided from a previous measurement that already established the baseline microparticle particle-size distribution. In some embodiments, the microparticle particle-size distribution may be measured again to check against the previous measurement.

The sample particle-size measurement and the baseline particle-size measurement are preferably conducted in the same type of liquid or vapor media. The sample particle-size measurement and the baseline particle-size measurement may be conducted in a gas, such as (but not limited to) air, or in a liquid media, such as (but not limited to) water, for example.

In step (e), "statistically equivalent" means that the sample particle-size measurement does not need to be exactly the same as the baseline particle-size measurement, complete surface functionalization to be verified. There may be slight shifts in signals if there are thick nanoparticle coatings or if nanoparticles are a significant percentage of the size of microparticles. These slight shifts may be accounted for in steps (e) and (f).

In some embodiments, the relative concentration of the surface-coated nanoparticles is determined by subtracting the relative concentration of the free nanoparticles from a known or estimated concentration of total nanoparticles within the sample.

In some embodiments, the relative concentration of the surface-coated nanoparticles is determined by the additional steps of:

(h) subjecting the sample to a surface defunctionalization to remove the surface-coated nanoparticles from the microparticles, thereby creating particle disassemblies comprising the microparticles and disassembled nanoparticles;

(i) subjecting the particle disassemblies to a disassembly particle-size measurement utilizing the particle-size measurement technique, thereby providing a disassembly particle-size distribution;

(j) subtracting the baseline particle-size distribution and the free-nanoparticle particle-size distribution from the disassembly particle-size distribution, to calculate a disassembled-nanoparticle particle-size distribution; and (k) determining the relative concentration of the surface-coated nanoparticles within the sample, based at least on the disassembled-nanoparticle particle-size distribution obtained in step (j).

In some embodiments, in step (h), the surface defunctionalization removes essentially all of the surface-coated nanoparticles from the microparticles. In other embodiments, in step (h), the surface defunctionalization removes less than all of the surface-coated nanoparticles from the microparticles, but this is acceptable as long as the nanoparticle removal efficiency of the surface defunctionalization is known or estimated.

The surface defunctionalization may be carried out in a vapor defunctionalization media, such as air or another gas (e.g., $N_2$, $O_2$, $CO_2$, Ar) or mixture of gases. The surface defunctionalization may be carried out in a liquid defunctionalization media, such as water, an organic solvent, an inorganic solvent, an ionic liquid, or a combination thereof. Optionally, the liquid defunctionalization media further contains a salt, a surfactant, an organic additive, an inorganic additive, or a combination thereof.

In some embodiments, the surface defunctionalization utilizes agitation, sonication, or a combination thereof. In these or other embodiments, the surface defunctionalization utilizes centrifugation, decantation, or a combination thereof (e.g., a use of a decanting centrifuge). In these or other embodiments, the surface defunctionalization utilizes filtration, membrane separation, or a combination thereof.

In some embodiments, the surface defunctionalization is carried out in a liquid defunctionalization media, and the particle disassemblies are dried for further analysis. In certain embodiments, step (b) is repeated to obtain a liquid-defunctionalization-media baseline particle-size measurement, thereby providing a potentially more accurate microparticle particle-size distribution for use in step (j). Step (b) does not need to be repeated if the original baseline particle-size measurement was obtained in the same or similar media as the liquid defunctionalization media.

In some embodiments, at least two distinct samples are taken from a batch of the hierarchical particle assemblies. In certain preferred embodiments, at least three distinct samples are taken from a batch of the hierarchical particle assemblies. That is, step (a) may include selecting at least three samples of hierarchical particle assemblies, and/or selecting a statistically significant number of samples from a production batch.

Some variations of the invention provide a mixture comprising microparticles, nanoparticles, and a fluid defunctionalization media, wherein the nanoparticles are unable to chemically or physically attach to the microparticles. In some embodiments, the fluid defunctionalization media is a liquid defunctionalization media, containing a component such as (but not limited to) water, an organic solvent, an inorganic solvent, an ionic liquid, or a combination thereof, and optionally further containing a salt, a surfactant, an organic additive, an inorganic additive, or a combination thereof.

The mixture may be produced by a process comprising the steps of:

(a) selecting at least one sample of hierarchical particle assemblies comprising microparticles and surface-coated nanoparticles, wherein the surface-coated nanoparticles are chemically and/or physically attached to the microparticles, and wherein, when surface functionalization is not complete, the sample further comprises free nanoparticles that are not chemically or physically attached to the microparticles;

(b) obtaining a baseline particle-size measurement of nanoparticle-free microparticles, thereby providing a microparticle particle-size distribution;

(c) subjecting the hierarchical particle assemblies to a sample particle-size measurement, thereby providing a sample particle-size distribution;

(d) comparing the sample particle-size measurement to the baseline particle-size measurement;

(e) if the sample particle-size measurement is statistically equivalent to the baseline particle-size measurement, then providing verification that there is complete surface functionalization and the absence of the free nanoparticles;

(f) if the sample particle-size measurement is statistically different than the baseline particle-size measurement, subtracting the baseline particle-size measurement from the sample particle-size measurement, to calculate a free-nanoparticle particle-size distribution;

(g) determining the relative concentration of the free nanoparticles within the sample, based at least on the free-nanoparticle particle-size distribution;

(h) subjecting the sample to a surface defunctionalization to remove the surface-coated nanoparticles from the microparticles, thereby creating particle disassemblies comprising the microparticles and disassembled nanoparticles;

(i) subjecting the particle disassemblies to a disassembly particle-size measurement utilizing the particle-size measurement technique, thereby providing a disassembly particle-size distribution;

(j) subtracting the baseline particle-size distribution and the free-nanoparticle particle-size distribution from the disassembly particle-size distribution, to calculate a disassembled-nanoparticle particle-size distribution; and (k) determining the relative concentration of the surface-coated nanoparticles within the sample, based at least on the disassembled-nanoparticle particle-size distribution obtained in step (j), wherein the mixture contains the microparticles, the disassembled nanoparticles, and the free nanoparticles (if any).

DETAILED DESCRIPTION OF EMBODIMENTS OF THE INVENTION

Figure 1:
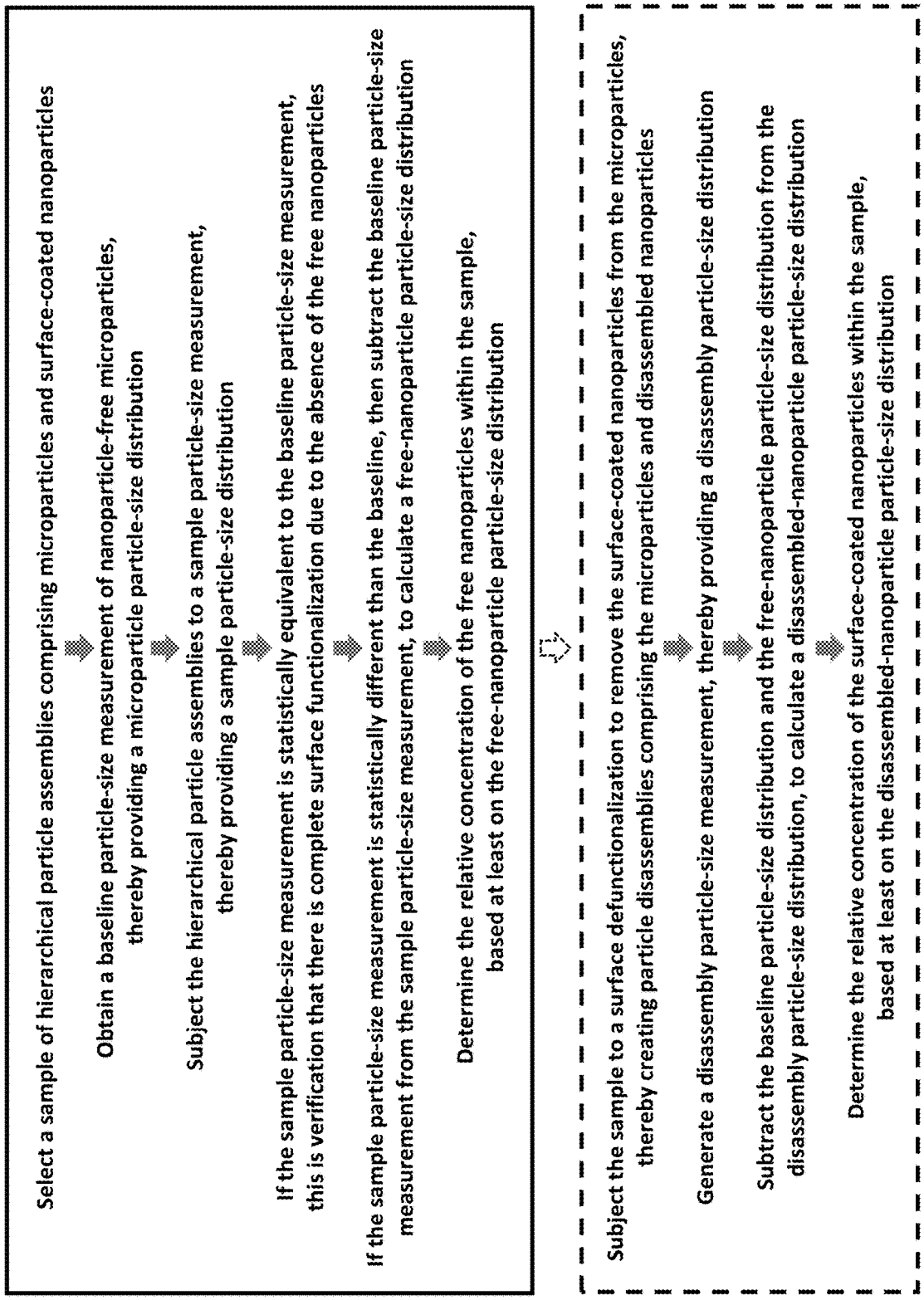
FIG. 1 depicts an exemplary flowchart of a method for inspecting surface-functionalized microparticles to verify surface functionalization, in some embodiments (the dotted box denotes optional steps).
Figure 2:
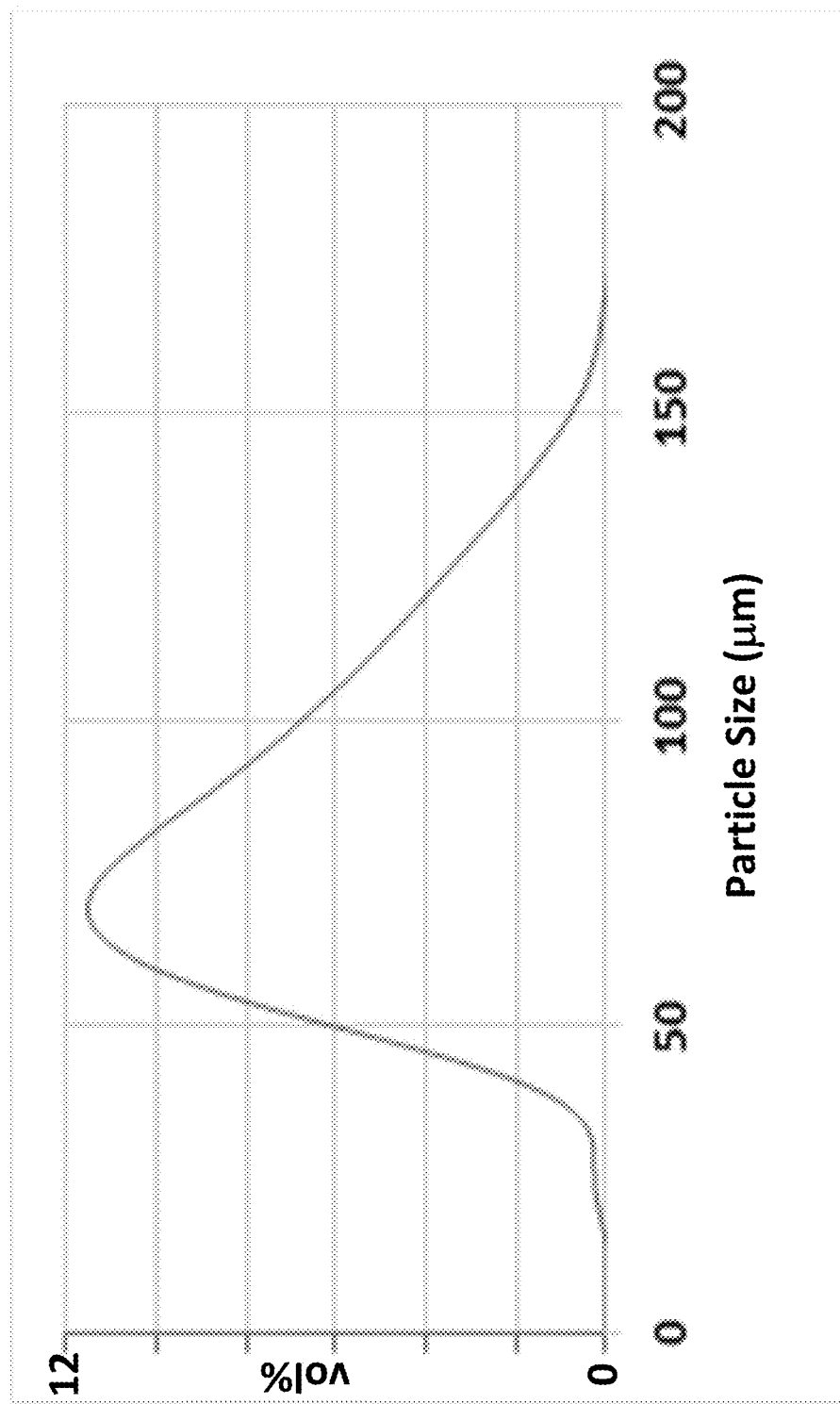
FIG. 2 shows an exemplary baseline particle-size distribution of microparticles in liquid media.
Figure 3:
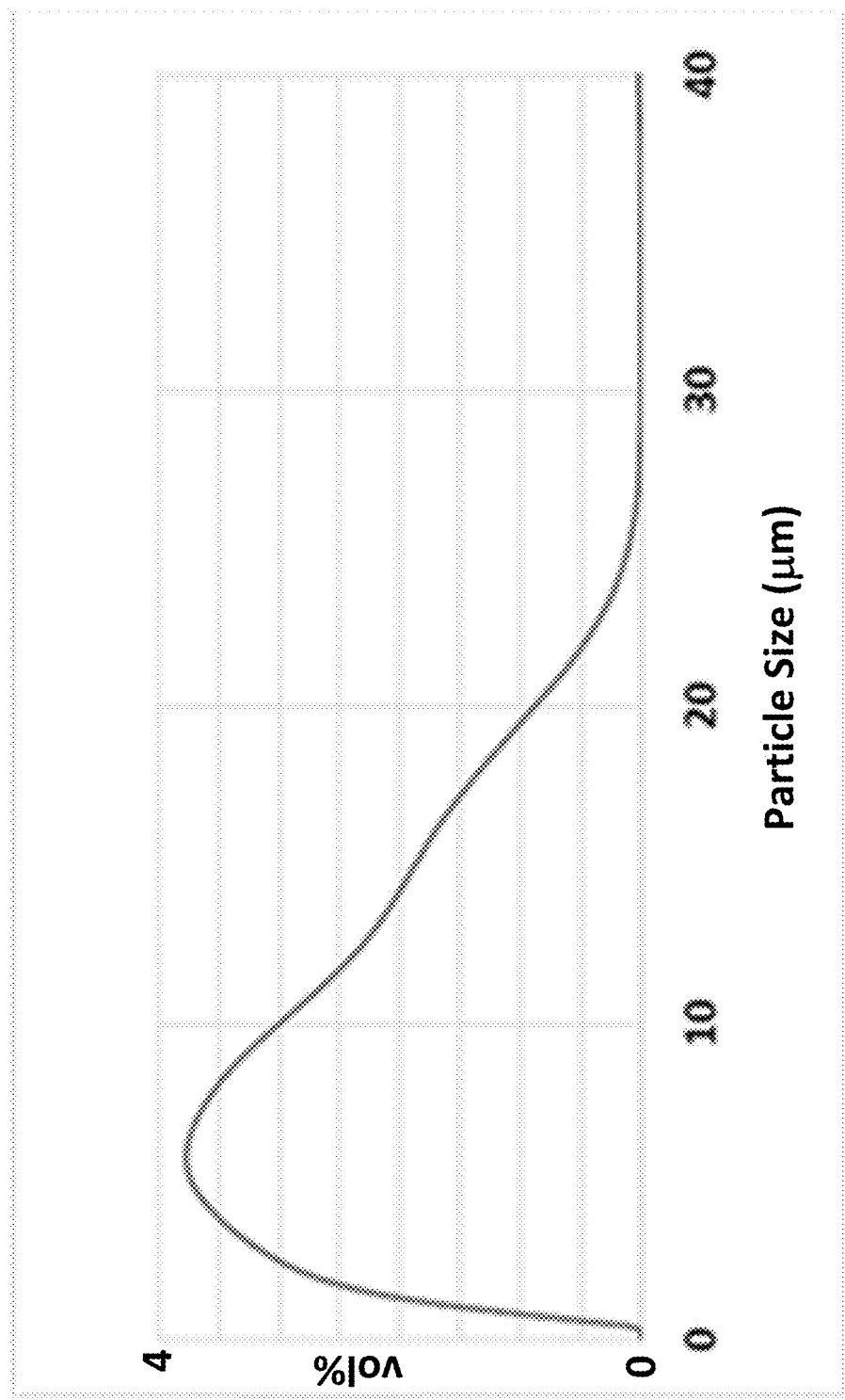
FIG. 3 shows an exemplary particle-size distribution of nanoparticles.
Figure 4:
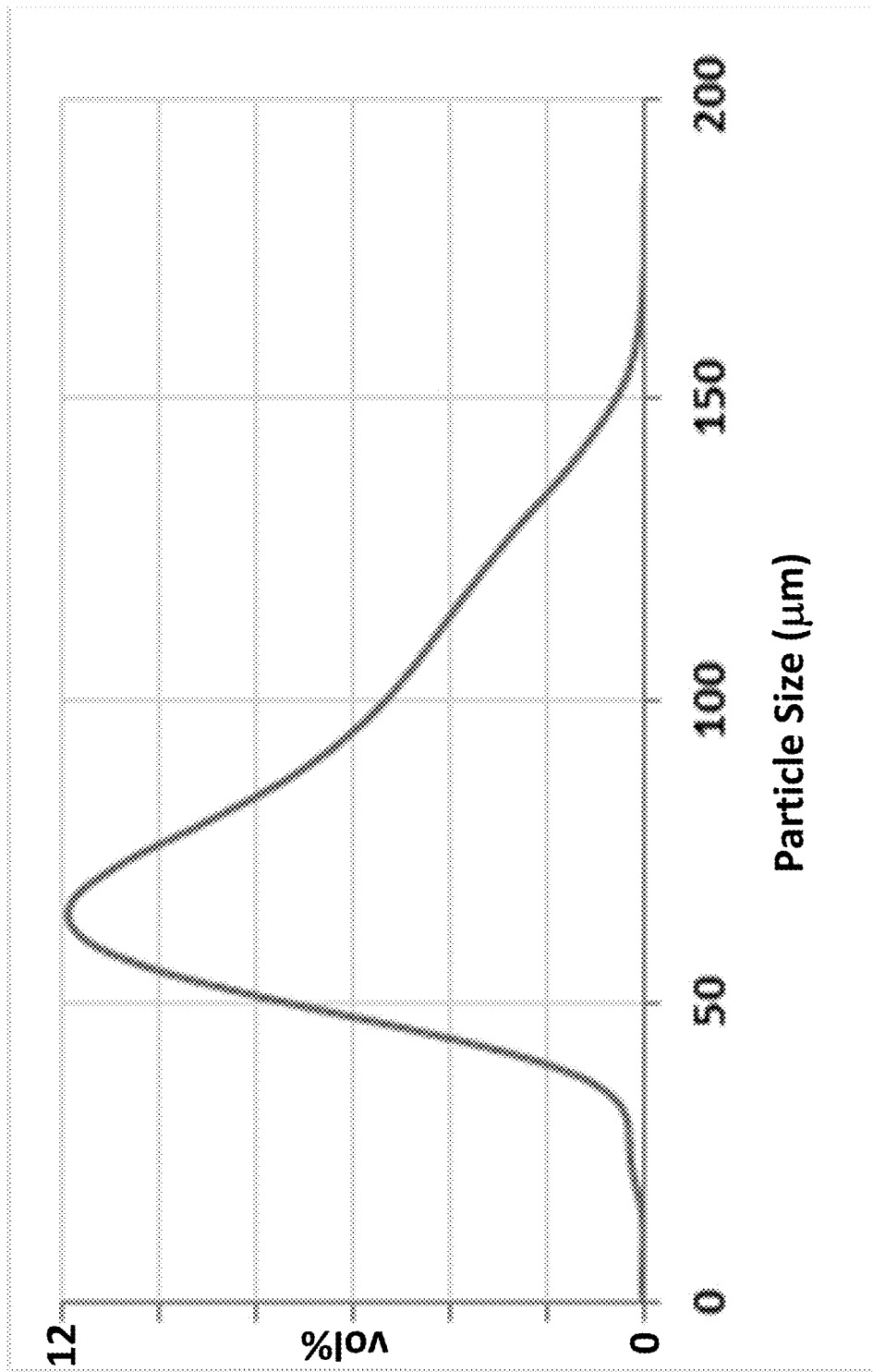
FIG. 4 shows an exemplary particle-size distribution of microparticles with chemically and/or physically attached nanoparticles on surfaces.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present disclosure is a methodology for determining the relative composition of hierarchical particle assemblies, in order to assess the effectiveness of assembly of one type of particle onto surfaces of a second, larger type of particle. In this disclosure, a "hierarchical particle assembly", a "hierarchical powder", a "surface-functionalized microparticle", and the like refer to a surface-functionalized microparticle that has smaller nanoparticles chemically and/or physically attached to the microparticle. In this disclosure, "particle" is synonymous with "particulate" unless explicitly indicated otherwise.

Some variations provide a rapid means of determining surface content of large, statistically significant quantities of hierarchical powders by utilizing the contrast in laser-light diffraction between microparticles individually, nanoparticles individually, and hierarchical powders containing both microparticles and nanoparticles. Some variations provide a method to disassemble hierarchical powders in order to account for nanoparticles that were attached to microparticles. The disclosed technique may be scalably applied for quality assurance of large quantities of hierarchical powders—a necessity for production of hierarchical powders at industrially relevant scales (hundreds of kilograms to metric tons).

Hierarchical particle assembly have been shown to influence the physical, mechanical, chemical, and processing characteristics of powder metallurgy alloys in additive manufacturing and other applications, arising from the ability to control the composition, structure, and volume fraction of nanoparticles assembled on surfaces of microparticles. See, for example, U.S. Pat. No. 9,738,788, issued on Aug. 22, 2017; U.S. Pat. No. 10,030,292, issued on Jul. 24, 2018; U.S. Pat. No. 10,648,082, issued on May 12, 2020; U.S. Pat. No. 10,682,699, issued on Jun. 16, 2020; and U.S. Pat. No. 10,787,728, issued on Sep. 29, 2020, all owned by HRL Laboratories, LLC (Malibu, Calif., USA) who is the assignee of this patent application. This specification also hereby incorporates by reference herein Martin et al., "3D printing of high-strength aluminium alloys," Nature vol. 549, pages 365-369 and supplemental online content (extended data), Sep. 21, 2017, in its entirety.

The above-described or other hierarchical powders benefit from assembly of different particle sizes into a hierarchical powder that is spatially uniform (i.e., powders coated evenly) and consistent (i.e., no large particle aggregates). Additionally, to increase the yield and decrease the cost in high-volume production of hierarchical powders, it is desirable in some embodiments to ensure that most, if not all, nanoparticles are actually assembled into the hierarchical powder and are not discarded as excess or present in the hierarchical powder as free particulates. Some variations solve these problems by providing a non-localized method for determining the composition and deposition effectiveness of hierarchical particle assemblies.

Some variations circumvent conventional limitations by providing a rapid (on the order of minutes), quantitative direct measurement that can be applied to large volumes of hierarchical powders for quality assurance or other purposes. Generally, the invention has applicability to powder processes in which hierarchical powders may provide a processing, performance, quality, and/or cost advantage. Such applications include, but are by no means limited to, additive manufacturing, sintering, metal injection molding, metal matrix composites, metal master alloys, welding, joining, hierarchical colloidal suspensions, nanoparticle or microparticle agglomerations, and mixed organic—inorganic assemblies.

Heretofore there have been no inspection or quality-assurance techniques for quantifying the structure of hierarchical powders beyond laboratory scale (milligrams of powder). Analysis of a sample of only milligrams of powder is not statistically sufficient when the sample is taken from a much larger commercial batch, such as 1 ton of powder. This invention, in some variations, satisfies a long-felt need by providing a rapid, quantitative, and large-volume measurement technique for evaluating the deposition effectiveness of particles of one size onto powder particles of a second, larger size. The disclosed techniques enable large batches of hierarchical powders to be quickly and effectively analyzed for consistency or quality-assurance purposes.

The techniques disclosed herein may be applied to metallic materials, non-metallic materials, or a combination thereof (e.g., ceramic nanoparticulates coated on metal microparticles). Generally speaking, the principles taught herein may be applied to any hierarchical powders that are produced, processed, used, reused, or recycled, especially hierarchical powders produced in in multiple batches or in total quantities above 1 kilogram.

"Nanoparticles" for purposes of this specification are particles with the largest dimension between about 1 nm and about 10000 nm. A preferred size of nanoparticles is about 7500 nm or less, about 5000 nm or less, about 3000 nm or less, about 2000 nm or less, about 1500 nm or less, or about 1000 nm or less. In some embodiments, nanoparticles are at least 50 nm in size. "Microparticles" for purposes of this specification are particles with the largest dimension between about 1 micron and about 1000 microns. The ratio of average particle size of microparticles to average particle size of nanoparticles may vary, such as about 2, about 3, about 5, about 10, about 15, about 25, about 50, about 100 about 1000, or about 10000. In some embodiments, this size ratio is from about 10 to about 1000. The nanoparticle and microparticle sizes may be selected based on the desired properties and function of the hierarchical powder. Generally speaking, nanoparticles are preferred over microparticles for functionalization.

Some variations (e.g., see FIG. 1) provide a method for inspecting surface-functionalized microparticles, the method comprising:

(a) selecting at least one sample of hierarchical particle assemblies comprising microparticles and surface-coated nanoparticles, wherein the surface-coated nanoparticles are chemically and/or physically attached to the microparticles, and wherein, when surface functionalization is not complete, the sample further comprises free nanoparticles that are not chemically or physically attached to the microparticles;

(b) obtaining a baseline particle-size measurement of nanoparticle-free microparticles, thereby providing a microparticle particle-size distribution;

(c) subjecting the hierarchical particle assemblies to a sample particle-size measurement, thereby providing a sample particle-size distribution;

(d) comparing the sample particle-size measurement to the baseline particle-size measurement;

(e) if the sample particle-size measurement is statistically equivalent to the baseline particle-size measurement, then providing verification that there is complete surface functionalization due to the absence of the free nanoparticles;

(f) if the sample particle-size measurement is statistically different than the baseline particle-size measurement, then subtracting the baseline particle-size measurement from the sample particle-size measurement, to calculate a free-nanoparticle particle-size distribution; and (g) determining the relative concentration of the free nanoparticles within the sample, based at least on the free-nanoparticle particle-size distribution.

In some embodiments, the sample particle-size measurement and the baseline particle-size measurement utilize a particle-size measurement technique selected from the group consisting of laser diffraction, dynamic light scattering, diffusing wave spectroscopy, static optical imaging, and dynamic optical imaging.

In certain embodiments, the particle-size measurement technique is laser diffraction. It should be noted that the relative differences in laser diffraction behavior between microparticles, nanoparticles, and hierarchical powders formed from microparticles and nanoparticles are dictated by the relative size differences between the various particles.

In step (b), the microparticle particle-size distribution may be measured or may be provided from a previous measurement that already established the baseline microparticle particle-size distribution. In some embodiments, the microparticle particle-size distribution may be measured again to check against the previous measurement.

The sample particle-size measurement and the baseline particle-size measurement are preferably conducted in the same type of liquid or vapor media. The sample particle-size measurement and the baseline particle-size measurement may be conducted in a gas, such as (but not limited to) air, or in a liquid media, such as (but not limited to) water, for example.

In step (e), "statistically equivalent" means that the sample particle-size measurement does not need to be exactly the same as the baseline particle-size measurement, complete surface functionalization to be verified. There may be slight shifts in signals if there are thick nanoparticle coatings or if nanoparticles are a significant percentage of the size of microparticles. These slight shifts may be accounted for in steps (e) and (f).

In some embodiments, the relative concentration of the surface-coated nanoparticles is determined by subtracting the relative concentration of the free nanoparticles from a known or estimated concentration of total nanoparticles within the sample.

In some embodiments (e.g., see FIG. 1, optional steps within dotted box), the relative concentration of the surface-coated nanoparticles is determined by the additional steps of:

(h) subjecting the sample to a surface defunctionalization to remove the surface-coated nanoparticles from the microparticles, thereby creating particle disassemblies comprising the microparticles and disassembled nanoparticles;

(i) subjecting the particle disassemblies to a disassembly particle-size measurement utilizing the particle-size measurement technique, thereby providing a disassembly particle-size distribution;

(j) subtracting the baseline particle-size distribution and the free-nanoparticle particle-size distribution from the disassembly particle-size distribution, to calculate a disassembled-nanoparticle particle-size distribution; and (k) determining the relative concentration of the surface-coated nanoparticles within the sample, based at least on the disassembled-nanoparticle particle-size distribution obtained in step (j).

In some embodiments, in step (h), the surface defunctionalization removes essentially all of the surface-coated nanoparticles from the microparticles. In other embodiments, in step (h), the surface defunctionalization removes less than all of the surface-coated nanoparticles from the microparticles, but this is acceptable as long as the nanoparticle removal efficiency of the surface defunctionalization is known or estimated.

The surface defunctionalization may be carried out in a vapor defunctionalization media, such as air or another gas (e.g., $N_2$, $O_2$, $CO_2$, Ar) or mixture of gases. The surface defunctionalization may be carried out in a liquid defunctionalization media, such as water, an organic solvent, an inorganic solvent, an ionic liquid, or a combination thereof. Optionally, the liquid defunctionalization media further contains a salt, a surfactant, an organic additive, an inorganic additive, or a combination thereof.

In some embodiments, the surface defunctionalization utilizes agitation, sonication, or a combination thereof. In these or other embodiments, the surface defunctionalization utilizes centrifugation, decantation, or a combination thereof (e.g., a use of a decanting centrifuge). In these or other embodiments, the surface defunctionalization utilizes filtration, membrane separation, or a combination thereof.

In some embodiments, the surface defunctionalization is carried out in a liquid defunctionalization media, and the particle disassemblies are dried for further analysis. In certain embodiments, step (b) is repeated to obtain a liquid-defunctionalization-media baseline particle-size measurement, thereby providing a potentially more accurate microparticle particle-size distribution for use in step (j). Step (b) does not need to be repeated if the original baseline particle-size measurement was obtained in the same or similar media as the liquid defunctionalization media.

In some embodiments, at least two distinct samples are taken from a batch of the hierarchical particle assemblies. In certain preferred embodiments, at least three distinct samples are taken from a batch of the hierarchical particle assemblies. That is, step (a) may include selecting at least three samples of hierarchical particle assemblies, and/or selecting a statistically significant number of samples from a production batch.

Embodiments of the invention will now be further described, including with reference to FIGS. 1-10. These embodiments shall not be construed to limit the claimed invention in any way. For convenience, reference is made to the figures from the Example, it being understood that these figures individually and collectively illustrate the principles of the invention but that other particle-size distributions, average particle sizes, particle types, and surface coverages are possible.

FIG. 1 depicts a methodology for determining particle-size distributions and hierarchical powder surface coverage.

In FIG. 1, the steps within the dotted box (bottom of flowchart) are optional. In FIGS. 2-9, particle-size distributions are shown, in which the X-axis is size in microns and the Y-axis is the relative volume of particles having the measured particle size (the origin is 0, 0 in each of FIGS. 2-9). The particle-size distributions in FIG. 2-9 are actual data obtained by laser-diffraction measurements.

In a laser-diffraction measurement, a powder mixture is exposed to monochromatic light, either as a mixture with a gas carrier (dry) or dispersed in a liquid (wet). As the laser passes through the powder mixture, light is scattered as it interacts with the particle sample. The angle of scattering relates to the refractive index of the material, the dispersant (gas or liquid), and the characteristic dimension of the particle with which the light interacts. Smaller particles will scatter light at a higher characteristic angle, whereas larger particles will scatter light at a lower characteristic angle. If the optical properties of the particles and dispersant are known, the differences in scattering angle observed by a detector can be used to correlate the measured angle with the particle-size distribution. Generally, nanoparticles will have a high angle of diffraction, microparticles will have a low angle of diffraction, and hierarchical particle assemblies will have a low angle of diffraction.

Some embodiments take advantage of the similarities in laser-diffraction response between the larger microparticles within the hierarchical powder and the hierarchical powder itself. When nanoparticles of a smaller characteristic size range are joined with microparticles of a larger characteristic size range, and the resulting hierarchical powder is exposed to monochromatic light, the laser essentially detects only the substrate microparticles due to the large relative differences in sizes between the constituent particles. The hierarchical-powder diffraction pattern (e.g., FIG. 4) is expected to theoretically match the diffraction pattern of the microparticles (e.g., FIG. 2), since the contributions of the surface nanoparticles (e.g., diffraction pattern of FIG. 3) are obscured by the background microparticle substrate. This can be observed by comparing FIGS. 2 and 4, which are nearly identical.

Taking advantage of this relationship, laser-diffraction measurements may be employed to identify both the residual nanoparticle content (i.e., nanoparticles not combined into a hierarchical assembly) and the nanoparticle coverage on the microparticle surface (volume or mass fraction contained within the hierarchical assembly).

Figure 5:
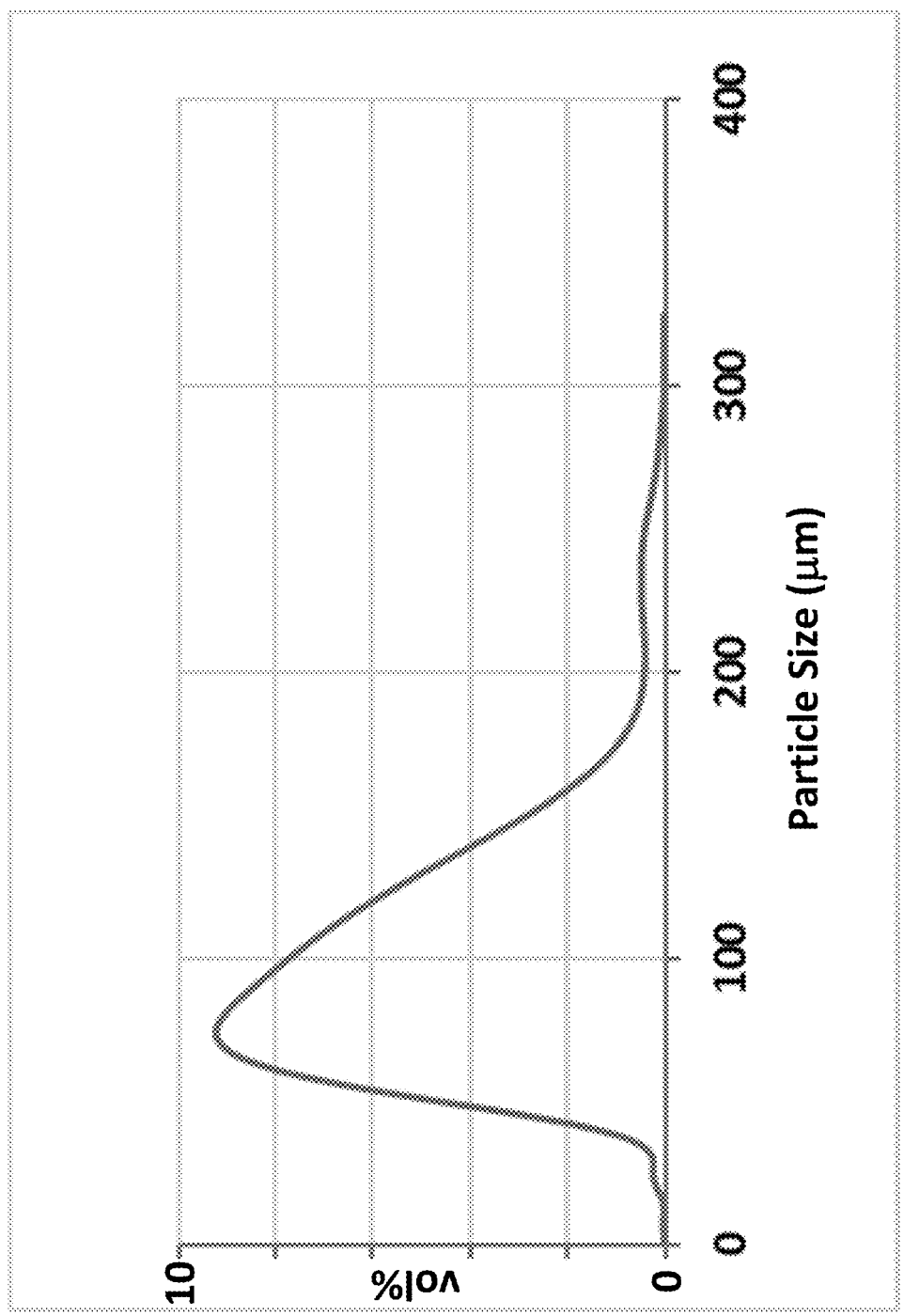
FIG. 5 shows an exemplary baseline particle-size distribution of microparticles in gas media.

First, the baseline microparticle distribution is determined using one or more laser-diffraction measurements in the absence of nanoparticles (FIG. 5). This measurement may be performed either dry (gas carrier) or wet (liquid dispersion). It should be noted that these measurements need only be performed once for every batch of microparticles and need not be performed for separate batches of hierarchical powder if they are composed of the same microparticle feedstock.

Next, an identical laser-diffraction measurement (FIG. 6) is performed on a hierarchical particle assembly under the same or very similar conditions (wet or dry). For this measurement, care should be taken to ensure that the carrier gas or liquid dispersant does not change the surface coverage of nanoparticles on the microparticle surfaces, which would negatively influence the measurement. The hierarchical powder distribution (FIG. 6) obtained from a laser-diffraction measurement is then compared against the baseline measurement (FIG. 5). In the ideal case in which there is complete surface coverage (i.e., all nanoparticles stick to microparticle surfaces), the two measurements are identical because the scattering angle measured by the detector is influenced by the microparticle substrate and not by the nanoparticle surface coverage. In reality, slight shifts in the diffraction angle may be observed for thick, multilayer nanoparticle surface coatings. Such shifts are expected to be minor and can be corrected for.

When the two measurements are not the same even after the above-noted minor corrections, it means that there are residual nanoparticles not sticking to microparticle surfaces. That is, residual nanoparticles that were not incorporated into the hierarchical powder will produce higher-angle scattering signals that can easily be picked up by the detector due to the large relative change in particle size and therefore diffraction angle (FIG. 6). This fact allows the distribution from the baseline powder (FIG. 5) to be overlaid on the distribution of hierarchical powder (FIG. 6) to identify relative differences corresponding to residual (free) nanoparticles, as shown in FIG. 7. The laser diffraction signals obtained from the hierarchical powder (FIG. 6) are subtracted from the laser diffraction signals of the microparticles themselves (FIG. 5) to obtain the amount and/or concentration of free nanoparticles (not on surfaces) within the hierarchical powder. In some embodiments, the method is complete after this step.

In some embodiments, the nanoparticle content present on the surfaces of the microparticles may be determined from a third laser-diffraction measurement (FIG. 8) of the hierarchical powder broken down into its individual constituent particles (microparticles and nanoparticles) prior to, or potentially during, measurement.

The removal of nanoparticles from microparticle surfaces may be accomplished in a number of ways. In various embodiments, the removal utilizes centrifuge separation, immersion into a high flowrate gas mixture (e.g., air or inert gas), immersion in a polar solvent, charge titration, milling, vibratory separation, or a combination thereof. Essentially, the purpose of this step is to break or weaken the attractive forces holding the nanoparticles in place on the microparticle surface, so that the previously chemically and/or physically attached nanoparticles become disassembled nanoparticles. The disassembled nanoparticles are distinct from residual, originally free nanoparticles that were never chemically and/or physically attached in the first place.

An additional baseline measurement (FIG. 9) may be performed if the removal procedure utilizes a different dry or liquid media than was employed in the baseline microparticle distribution of FIG. 5. If the removal procedure employs the same dry or liquid media, then FIG. 5 may be used as the baseline particle-size distribution.

The mixture of disassembled nanoparticles and microparticles is then passed through the laser-scattering measurement system and subtracted from the baseline microparticles obtained in the appropriate fluid media (FIG. 9 or FIG. 5). This yields the total nanoparticle content (nanoparticles on and off microparticle surfaces) that was originally present in the assembly. When subtracted from the original free nanoparticle content, one can obtain the amount of nanoparticles that was initially present on the surfaces of microparticles in the hierarchical powder. Also, if the total amount or concentration of all nanoparticles that was originally used in powder synthesis is known, then the calculated total nanoparticle content may be used as verification of mass balance.

In preferred embodiments, the technique to remove nanoparticles from microparticle surfaces causes complete defunctionalization, i.e. removal of essentially all of the surface nanoparticles. In this context, "essentially all" means at least 95 vol %, preferably at least 99 vol %, and most preferably at least 99.9 vol % of the originally surface-functionalized nanoparticles. In other embodiments, the technique to remove nanoparticles from microparticle surfaces causes less than complete, but known, defunctionalization. For example, if separate experiments are carried out to establish that a selected defunctionalization technique at prescribed conditions and media removes about 80 vol % of the surface-functionalized nanoparticles, then the overall calculations can correct for this in determining the original nanoparticle content on microparticle surfaces.

In some embodiments, complete defunctionalization is verified by quantitative analysis of two particle-size distributions indicating that the volume added to the base powder is the measured amount from the integrated curve of the nanoparticles. These embodiments may quantitatively assess what was attached to the powder with a known sample with a known addition. The same procedure may then be completed with an unknown sample, such as a sample that has been recycled or used in additive manufacturing several times. The remaining functionalization content on the surface may be determined and compared to the expected volume added at the manufacturing stage of the powder.

The methods disclosed herein may, in principle, may performed on a single sample surveyed from a production batch. Preferably, the methods are performed on at least two samples from a production batch, and more preferably, at least three samples.

A minimum of three separate laser-diffraction procedures are preferably performed on a single batch of hierarchical powder. Each procedure may be performed on the same sample of hierarchical powder or on separate samples from the same batch, which samples preferably form a statistically significant representation of the larger volume being analyzed. Within a procedure, there are multiple measurements, as explained earlier, to obtain different particle-size distributions. That is, even when there is a single procedure performed on a single sample (which is statistically inferior), there are at least two particle-size distribution measurements—a baseline measurement and a sample measurement.

A person skilled in the art can determine how to sample for sufficient statistically significance. See, for example, ASTM E122-17, "Standard Practice for Calculating Sample Size to Estimate, With Specified Precision, the Average for a Characteristic of a Lot or Process", ASTM E1402-13 (2018), "Standard Guide for Sampling Design", and ASTM E1488-12(2018), "Standard Guide for Statistical Procedures to Use in Developing and Applying Test Methods", which are hereby incorporated by reference herein. According to statistical principles, the sample quantity is typically much smaller than the commercial production size (conceivably, an entire batch could be tested).

Some variations of the invention provide a mixture comprising microparticles, nanoparticles, and a fluid defunctionalization media, wherein the nanoparticles are unable to chemically or physically attach to the microparticles. By "unable to chemically or physically attach to the microparticles", it is meant that when the mixture is allowed to sit at 25° C. for a time that avoids any mass-transfer limitations (e.g., 1-10 hours), at least 95 vol %, preferably at least 99 vol %, and most preferably at least 99.9 vol % of the nanoparticles do not chemically and/or physically attach to surfaces of the microparticles. Nanoparticles that do not chemically or physically attach to the microparticles may settle within a container of the mixture. The settling may be observable if there is a difference in color of nanoparticles versus microparticles. The settling may also be observable according to particle-size analysis as a function of height of a bed of particles in a container of the mixture.

A mixture comprising microparticles, nanoparticles, and a fluid defunctionalization media, wherein the nanoparticles are unable to chemically or physically attach to the microparticles, is useful in the disclosed methods at least for the step of subjecting the sample to a surface defunctionalization to remove surface-coated nanoparticles from microparticles, thereby creating particle disassemblies comprising microparticles and disassembled nanoparticles. If the nanoparticles are unable to chemically or physically attach to the microparticles, then any nanoparticles that come free from the surface do not re-attach to that surface, and any originally free nanoparticles do not attach to the surface, thereby enhancing the accuracy of the overall method.

In some embodiments, the fluid defunctionalization media is a liquid defunctionalization media, containing a component such as (but not limited to) water, an organic solvent (e.g., isopropyl alcohol), an inorganic solvent, an ionic liquid, or a combination thereof, and optionally further containing a salt, a surfactant, an organic additive, an inorganic additive, or a combination thereof.

In some embodiments, the mixture (comprising microparticles, nanoparticles, and a fluid defunctionalization media) is separated with or without agitation. For example, a decanter or centrifuge (or a decanting centrifuge) may be employed to separate microparticles from nanoparticles, wherein density differences cause separation. In some embodiments, the mixture is filtered to separate microparticles from nanoparticles, wherein differences in permeation through filter pores causes separation. In some embodiments, the mixture is dried to form a dry mixture of separated microparticles and nanoparticles. In any of these embodiments, the separated materials may be further analyzed, such as compositional analysis, to determine the efficiency of the defunctionalization that is employed in some embodiments.

The mixture may be produced by a process comprising the steps of:

(a) selecting at least one sample of hierarchical particle assemblies comprising microparticles and surface-coated nanoparticles, wherein the surface-coated nanoparticles are chemically and/or physically attached to the microparticles, and wherein, when surface functionalization is not complete, the sample further comprises free nanoparticles that are not chemically or physically attached to the microparticles;

(b) obtaining a baseline particle-size measurement of nanoparticle-free microparticles, thereby providing a microparticle particle-size distribution;

(c) subjecting the hierarchical particle assemblies to a sample particle-size measurement, thereby providing a sample particle-size distribution;

(d) comparing the sample particle-size measurement to the baseline particle-size measurement;

(e) if the sample particle-size measurement is statistically equivalent to the baseline particle-size measurement, then providing verification that there is complete surface functionalization and the absence of the free nanoparticles;

(f) if the sample particle-size measurement is statistically different than the baseline particle-size measurement, subtracting the baseline particle-size measurement from the sample particle-size measurement, to calculate a free-nanoparticle particle-size distribution;

(g) determining the relative concentration of the free nanoparticles within the sample, based at least on the free-nanoparticle particle-size distribution;

(h) subjecting the sample to a surface defunctionalization to remove the surface-coated nanoparticles from the microparticles, thereby creating particle disassemblies comprising the microparticles and disassembled nanoparticles;

(i) subjecting the particle disassemblies to a disassembly particle-size measurement utilizing the particle-size measurement technique, thereby providing a disassembly particle-size distribution;

(j) subtracting the baseline particle-size distribution and the free-nanoparticle particle-size distribution from the disassembly particle-size distribution, to calculate a disassembled-nanoparticle particle-size distribution; and (k) determining the relative concentration of the surface-coated nanoparticles within the sample, based at least on the disassembled-nanoparticle particle-size distribution obtained in step (j), wherein the mixture contains the microparticles, the disassembled nanoparticles, and the free nanoparticles (if any).

The separated microparticles may be subjected to the above method again. For example, the microparticles may be obtained from the mixture by removing (e.g., by centrifuging or filtering) at least the nanoparticles, and optionally the fluid defunctionalization media. The microparticles in this case may be verified to not contain any surface nanoparticles, i.e. to show that the selected defunctionalization technique is perfect. Or, the efficiency of the selected defunctionalization technique may be determined (e.g., less than 100 vol %), so that the correction may be applied to future use of the method.

Many embodiments, alternatives, and options will now be further described, without limitation.

It will be understood by a person skilled in the art that the principles taught herein will work even when the particles attached to microparticles are bigger than 1000 nm in average size. What is required is that the surface-functionalized particles be smaller than the base microparticles. The surface-functionalized particles may themselves be micron-sized particles, such as about 1, 2, 3, 4, 5, 6, 7, 8, 9, or 10 microns in diameter. Conversely, the principles taught herein work when there are very small nanoparticles coated on larger nanoparticles that are less than 1000 nm in average size. Preferably, on average, the base particles are at least 2×, 3×, 4×, 5×, 10×, 20×, 50×, or 100× larger than the smaller particles that are chemically and/or physically attached to surfaces of the base particles.

Some embodiments measure nanofunctionalization of metal powders, while other embodiments measure nanofunctionalization of polymer particles, ceramic particles, glass particles, carbon particles, or mixtures of different materials.

Functionalized feedstocks may be powder feedstocks. As intended herein, "powder feedstocks" refers to any powdered metal, ceramic, polymer, glass, composite, or combination thereof. In preferred embodiments, the powder feedstocks are metals or metal-containing compounds, such as (but not limited to) Al, Mg, Ni, Fe, Cu, Ti, V, Si, or combinations thereof, for example.

The nanoparticles or microparticles are typically a different composition than the base powder. Nanoparticles or microparticles may include metals, ceramics, cermets, intermetallic alloys, oxides, carbides, nitrides, borides, polymers, carbon, and combinations thereof, for example, or other materials which upon processing form one or more of the aforementioned materials.

Generally speaking, the nanofunctionalized materials may contain one or more alloying elements selected from the group consisting of Si, Fe, Cu, Ni, Mn, Mg, Cr, Zn, V, Ti, Bi, Ga, Pb, or Zr. Other alloying elements may be included, such as (but not limited to) H, Li, Be, B, C, N, O, F, Na, P, S, Cl, K, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof. These other alloying elements may function as grain refiners, as strength enhancers, as stability enhancers, or a combination thereof.

In some embodiments, the nanoparticles or microparticles contain one or more elements selected from the group consisting of zirconium, tantalum, niobium, titanium, and combinations, oxides, nitrides, hydrides, carbides, or borides thereof. As a specific example pertaining to zirconium, the zirconium may be present as $ZrH_x$ (x=0 to 4), i.e. in hydride form when x>0. An exemplary zirconium hydride is $ZrH_2$ (see Example).

Powder particle sizes are typically between about 1 micron and about 1 millimeter, but in some cases could be as much as about 1 centimeter. The powdered feedstock may be in any form in which discrete particles can be reasonably distinguished from the bulk. The powder may be present as loose powders, a paste, a suspension, or a green body, for example. A green body is an object whose main constituent is weakly bound powder material, before it has been melted and solidified.

Powder particles may be solid, hollow, or a combination thereof. Particles can be made by any means including, for example, gas atomization, milling, cryomilling, machine chipping, machining-ribbon processing, wire explosion, laser ablation, electrical-discharge machining, or other techniques known in the art. The powder particles may be characterized by an average aspect ratio from about 1:1 to about 100:1. The "aspect ratio" means the ratio of particle length to width, expressed as length:width. A perfect sphere has an aspect ratio of 1:1. For a particle of arbitrary geometry, the length is taken to be the maximum effective diameter and the width is taken to be the minimum effective diameter.

In some embodiments, the particles within the powder feedstock are rod-shaped particles or domains resembling long sticks, dowels, or needles. The average diameter of the rod-shaped particles or domains may be selected from about 5 nanometers to about 100 microns, for example. Rods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual shape. In some embodiments, particles have a high aspect ratio (such as greater than 5:1) with some curvature along the length.

"Surface functionalization" refers to a surface modification on the powdered materials, which modification may affect the solidification behavior (e.g., solidification rate, yield, grain quality, heat release, etc.) of the powder materials. In various embodiments, a powdered material is functionalized with about 1%, 2%, 5%, 10%, 15%, 20%, 25%, 30%, 40%, 50%, 60%, 70%, 80%, 85%, 90%, 95%, 99%, or 100% of the surface area of the powdered material having nanoparticles chemically and/or physically attached to the surface. In some embodiments, the surface functionalization includes a nanoparticle coating that may be a continuous coating or a discontinuous coating.

Nanoparticles or microparticles may be spherical or of arbitrary shape with the largest dimension typically not exceeding the above largest dimensions. An exception is structures with extremely high aspect ratios, such as carbon nanotubes in which the dimensions may include up to 100 microns in length but less than 100 nm in diameter. The nanoparticles or microparticles may include a coating of one or more layers of a different material.

Nanoparticles may be attached to microparticles using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof.

Many methods are possible for nanofunctionalizing powders. Some methods of producing surface-functionalized powder materials include immersion deposition, electroless deposition, vapor coating, solution/suspension coating of particles with or without organic ligands, and utilizing electrostatic forces and/or Van der Waals forces to attach particles through mixing.

In some variations, a solvent approach is employed in which a solvent (such as water or tetrahydrofuran) and nanoparticles are added to a base powder feedstock, mixed, and then dried. The choice of solvent(s) will depend on solvent compatibility of the nanoparticles and base powder. The solvent should dissolve or suspend at least one of the components (nanoparticles or base powder). In certain embodiments, a slurry of dispersed nanoparticles in solvent is sprayed on powder feedstock while mixing in order to coat all the feedstock powders with nanoparticles. Following removal of solvent, Van der Waals forces, chemical bonds, physical adsorption, or other forces may cause the nanoparticles to be retained on surfaces of the powder particles. In certain co-solvent embodiments, nanoparticle precipitation is triggered by mixing a poor co-solvent into a homogeneous solution that contains the nanoparticles.

The nanoparticles may be dissolved in a solvent that has lower surface energy than the nanoparticles. When this solvent is evaporated from a mixture of nanoparticles and microparticles, the nanoparticles are drawn by capillary forces to microparticle surfaces, in some embodiments.

The solvent for dissolving or suspending nanoparticles and/or base powder may be selected from polar organic solvents (e.g., acetone), non-polar organic solvents (e.g., n-hexane), polar inorganic solvents (e.g., water), non-polar inorganic solvents, ionic liquids, compressed and liquefied gases (e.g., liquefied carbon dioxide), supercritical fluids (e.g., supercritical carbon dioxide), or a combination thereof.

In some embodiments, the solvent comprises or consists essentially of a compressed and liquefied gas and/or a supercritical fluid. In certain embodiments, the solvent is liquefied or supercritical $CO_2$. Employing a liquefied or supercritical $CO_2$ solution of nanoparticles and powder feedstock allows mixing of the powder particles in a fluidized bed, with the benefit of not requiring a flammable solvent (i.e., mixing is conducted in an atmosphere incapable of igniting). After nanofunctionalization, the $CO_2$ may be vented off quickly and recycled, thereby eliminating waste while also drying the powder. Following removal of liquefied or supercritical $CO_2$, Van der Waals forces, chemical bonds, physical adsorption, or other forces may cause the nanoparticles to be retained on surfaces of the powder particles.

In some variations, nanoparticles are assembled onto powder particles via dry mixing, in which nanoparticles are added to dry powder feedstock and mixed. The dry mixing may be accomplished by stirring, rolling, vibration, ball milling, centrifugation, fluidized-bed blending, sonication, or another mechanical technique. Dry mixing may be carried out with a gas-containing mixing media, such as (but not limited to) air, nitrogen, carbon dioxide, argon, or a combination thereof. Following dry mixing, Van der Waals forces, chemical bonds, physical adsorption, or other forces may cause the nanoparticles to be retained on surfaces of the powder particles. Sonication is the application of sound energy (such as at a frequency of 20 kHz or more) to agitate the nanoparticles and microparticles, to promote mixing and assembly.

When dry mixing using a gas-phase mixing media, it is preferable to maintain an atmosphere to retain the mixing media, the powder particles, and the nanoparticles in the desired state(s). Also, a closed environment is preferred to avoid the escape of particles from the system.

In some variations, nanoparticles are assembled onto powder particles via electrostatic interactions. Electrostatic assembly may be carried out by introducing opposite electrical charges, or at least polarities, to the nanoparticles versus the powder particle surfaces, prior to or during nanofunctionalization. Electrostatic interactions can be preferred since they are generally isotropic and reasonably strong. Electrostatic assembly may be done with wet mixing (i.e. with a solvent present), dry mixing, or a sequential combination thereof. For example, the powder particles may be blown as dry material while mixing with nanoparticles, inducing a static charge that enables nanoparticles to be retained on surfaces of the powder particles. In these variations, electrostatic forces cause the nanoparticles to be retained on surfaces of the powder particles. Charged nanoparticles (induced from blowing as a dry material) may be deposited onto oppositely charged powder surfaces, along with chemical bond formation. Electrical charges may also be induced by exposure to an electrical or electromagnetic field, or by chemical reaction, for example.

Other techniques for assembling nanoparticles onto powder particles include, but are not limited to, centrifuge sedimentation, electromagnetic sedimentation, electrochemical deposition, and pulse-laser deposition. Various force fields may be utilized, such as electric fields, magnetic fields, or physical force fields. Physical forces may include high-velocity impingement, viscous flow, or large amplitude oscillatory shear, for example.

Selective placement techniques may be utilized to place individual atoms or atom clusters onto powder particle surfaces. While these techniques theoretically work, atom-scale techniques are expensive. In these embodiments, nanoparticles may be grown on surfaces at desired locations by introducing nanoparticle precursors or components, in solid, liquid, or vapor form.

In any of these method embodiments, the nanoparticles may be generated ex situ, generated in situ, or a combination thereof. Ex situ generation of nanoparticles means that the nanoparticles are introduced to the powder surface already in the form of nanoparticles, from a prior step. In situ generation of nanoparticles means that nanoparticles are made from a precursor that has already been applied, or is continuously applied, to the powder surface. For example, nanoparticles may be generated in situ by pulse-wire discharge (wire explosion), solidification from a vapor phase containing nanoparticle precursors, vaporization followed by solidification, or other means. In conjunction with such in situ nanoparticle formation, the powder feedstock may be mixed for assembly by wet mixing, dry mixing, electrostatic interactions, or a combination thereof.

Assembly aids may be incorporated into synthesis methods. Assembly aids enhance the retention of nanoparticles on surfaces of the powder particles. In particular, assembly aids may enhance the chemical kinetics of nanoparticle assembly, the thermodynamics of nanoparticle assembly, or the diffusion or mass transport of nanoparticle assembly, for example. Assembly aids may be selected from the group consisting of surfactants, salts, dissolved ions, charged molecules, polar or non-polar solvents, hierarchically sized particulates, surface etchants for surface texture, and combinations thereof. For example, surfactants may reduce surface tension between nanoparticles and powder surfaces, resulting in better wetting and assembly. Salts or ions may alter the surface charge of the nanoparticles or powder surfaces, resulting in ionic bonds that enhance the assembly. Surface etchants may physically etch the surface of the powder to promote adsorption of nanoparticles.

The powder surface, the nanoparticles, or both of these may be functionalized with materials to enhance chemical or electrostatic attachment of the powder particles with nanoparticles. In some embodiments, for example, nanoparticle coatings may be applied using immersion deposition in an ionic liquid, depositing a more-noble metal on a substrate of a less-noble, more-electronegative metal by chemical replacement from a solution of a metallic salt of the coating metal. The metals may be selected from the group consisting of aluminum, zirconium, titanium, zinc, nickel, cobalt copper, silver, gold, palladium, platinum, rhodium, titanium, molybdenum, uranium, niobium, tungsten, tin, lead, tantalum, chromium, iron, indium, rhenium, ruthenium, osmium, iridium, and combinations or alloys thereof.

Organic ligands may be reacted onto a reactive metal, in some embodiments for depositing nanoparticles. The reactive metal may be selected from the group consisting of alkali metals, alkaline earth metals, aluminum, silicon, titanium, zirconium, hafnium, zinc, and combinations or alloys thereof. In some embodiments, the reactive metal is selected from aluminum, magnesium, or an alloy containing greater than 50 at % of aluminum and/or magnesium. Organic ligands may be selected from the group consisting of aldehydes, alkanes, alkenes, silicones, polyols, poly(acrylic acid), poly(quaternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), poly(carboxymethylcellulose), poly(D- or L-lysine), poly(L-glutamic acid), poly(L-aspartic acid), poly(glutamic acid), heparin, dextran sulfate, 1-carrageenan, pentosan polysulfate, mannan sulfate, chondroitin sulfate, and combinations or derivatives thereof.

The nanoparticles may be in the form of a monolayer, a multilayer, or less than one monolayer (e.g., from about 1% to 100% of one monolayer) and may be organized or unorganized at the powder surfaces, depending on the method employed. When high surface coverage is desired, drop-casting, spin-coating, or spray-coating, or Langmuir-Blodgett coating may be utilized.

In drop-casting, a nanoparticle dispersion is spread over a substrate and allowed to dry under controlled conditions, e.g. pressure and temperature. In principle, film thickness depends on the volume of dispersion used and the particle concentration, both of which can be easily varied. There are also other variables that affect the film structure such as how well the solvent wets the substrate, evaporation rate, capillary forces associated with drying, etc. Generally, it is desirable to use solvents that are volatile, wet the substrate, and are not susceptible to thin film instabilities (de-wetting). Water tends to be a poor solvent for drop-casting due to the low vapor pressure and large surface tension. Organic solvents (such as hexane, toluene, alcohols, or halogenated solvents) are often good choices for nanoparticles with hydrophobic capping ligands.

Spin-coating often provides more uniform film thicknesses across the substrate compared with drop-casting, and can accommodate larger substrates. In this technique, a substrate is spun at high speed and a volume of material with known particle concentration is introduced into the center. Centrifugal force leads to uniform spreading of the dispersion across the substrate, followed by evaporation of solvent to yield a thin particle film. Film thickness depends on the dispersion concentration, volume, and the rotational velocity. As with drop-casting, solvents other than water are favored. Slowly withdrawing a substrate from a nanoparticle dispersion causes particles to be drawn into the meniscus and deposited as the thin liquid layer dries.

Spray-coating utilizes a homogenous, aerosolized stream applied onto a target substrate. For example, a syringe pump may be used to supply a constant liquid flow to a nebulizer where the stream is combined with an inert gas. The resulting mixture forms aerosolized droplets (containing nanoparticles) that deposit onto the substrate (powder particles) in a homogenous manner. The nebulizer may be attached to a movable platform that covers a wide range of area. Volatile solvents are preferred to maximize liquid evaporation and reduce any potential nanoparticle aggregation associated with capillary forces during drying.

Langmuir-Blodgett troughs offer a high level of control over the nanoparticle deposition process since the formation of the nanoparticle film can be performed separately from the transfer of the film to the substrate (powder particles). In using this technique, a dispersion of nanoparticles is evaporated onto an immiscible liquid substrate in the Langmuir-Blodgett trough. The nanoparticle layer can then be compressed using a movable barrier to obtain uniform monolayer or sub-monolayer films over relatively large areas. A substrate can be dipped into the particle layer, or a pre-submerged substrate can be withdrawn, and the nanoparticle film deposits at the liquid-solid interface. Uniform film formation across the powder particles is possible.

In some variations, the nanoparticles act as grain refiners to give a unique microstructure to an object produced starting with a nanofunctionalized metal powder. The grain refiners may be designed with specific compositions for a given metal powder and can be incorporated at higher concentrations than previously possible due to assembly of the grain refiners on the surface of a base metal or metal alloy powder. This approach enables the production of metal alloys that were previously difficult to process.

The materials and methods disclosed herein may be applied to additive manufacturing as well as joining techniques, such as welding. Certain unweldable metals, such as high-strength aluminum alloys (e.g., aluminum alloys Al 7075, Al 7050, or Al 2199) would be excellent candidates for additive manufacturing but normally suffer from hot cracking. The principles disclosed herein allow these alloys to be processed with significantly reduced cracking tendency. In particular, nanofunctionalized metal powder may be converted to a metal alloy object through various means, such as additive manufacturing or other metal processing, wherein the metal alloy object is characterized by a unique microstructure.

A unique microstructure may be produced in a wide variety of alloy systems, as well as from metal processing beyond additive manufacturing. Incorporation of previously impossible concentrations and types of grain refiners is possible, due to grain-refining elements being disposed on surfaces of base alloy powder. Some embodiments utilize functionalization to incorporate grain refiners directly at the site of melting, negating the need for expensive processing and making use of commercially available alloy powders. This technique is in contrast to incorporation of grain refiners into the internal regions of powder particles, which requires extremely high temperatures during gas atomization. Such high temperatures can cause volatility of certain alloying elements (including Zn, Mg, and Li), and can be damaging to equipment due to the high reactivity of some elements in metal alloys.

In some embodiments, a metal alloy microstructure (produced starting with the nanofunctionalized metal powder) is "substantially crack-free" which means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. These sorts of cracks containing material (other than gases) may be referred to as "inclusions." The non-desirable material disposed within the inclusion may itself contain a higher porosity than the bulk material, may contain a different crystalline (or amorphous) phase of solid, or may be a different material altogether, arising from impurities during fabrication, for example. Large phase boundaries can also form inclusions.

The metal alloy microstructure may be substantially free of porous defects, in addition to being substantially crack-free. "Substantially free of porous defects" means at least 99 vol % of the metal alloy contains no porous voids having an effective diameter of at least 1 micron.

Preferably, at least 80 vol %, more preferably at least 90 vol %, even more preferably at least 95 vol %, and most preferably at least 99 vol % of the metal alloy contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, and optionally to arrive at a final additively manufactured metal part that is substantially free of porous defects in addition to being substantially crack-free.

In some embodiments, a metal alloy microstructure (produced starting with the nanofunctionalized metal powder) has "equiaxed grains" which means that at least 99 vol % of the metal alloy contains grains that have approximately equal length, width, and height. In the metal alloy, crystals of metal alloy form grains in the solid. Each grain is a distinct crystal with its own orientation. The areas between grains are known as grain boundaries. Within each grain, the individual atoms form a crystalline lattice. Equiaxed grains result when there are many nucleation sites arising from grain-refining nanoparticles contained in the metal alloy microstructure.

The equiaxed grains, and reduction or elimination of cracks, in the final microstructure results from the presence of grain-refining nanoparticles in the initial nanofunctionalized metal powder.

Grain-refining nanoparticles are preferably present in a concentration of at least 0.01 vol %, such as at least 0.1 vol %, at least 1 vol %, or at least 5 vol %. In various embodiments, the grain-refining nanoparticles are present in a concentration of about, or at least about, 0.1, 0.2, 0.5, 1, 2, 3, 4, 5, 6, 7, 8, 9, or 10 vol %. The concentration of the grain refiner may be varied by adjusting the amount of grain refiner functionalized on the powder surface, and/or by adjusting the concentration of functionalized micropowders versus non-functionalized micropowders in the final material.

The preferred concentration of grain refiner(s) will depend on the selected alloy and grain refiner. In certain alloys, grain refinement should be minimized to avoid potential detrimental interactions; however, some alloy systems such as Al 7075 can accommodate greater concentrations. Due to the ease of producing and processing the material, routine experimentation can be performed by a person of ordinary skill in the art to inform material selection and concentration for the grain-refining nanoparticles.

The number of nanoparticles per microparticle can vary widely. The average number of individual nanoparticles disposed on one microparticle (equivalently, the average number ratio of nanoparticles to powder microparticles) may be about 10, about $10^2$, about $10^3$, about $10^4$, about $10^5$, or about $10^6$, for example. The nanoparticle distribution on the powder particle surface can vary. In some embodiments, surface regions contain a relatively higher concentration of nanoparticles, which may be agglomerated at the surface in those regions.

The nanoparticle surface coverage may also vary widely, from about 1% to 100%, in various embodiments. The nanoparticle surface coverage is the average area fraction of powder particles that is covered by assembled nanoparticles. For example, the nanoparticle surface coverage may be about, or at least about, 1%, 5%, 10%, 20%, 30%, 40%, 50%, 60%, 70%, 80%, 90%, or 100%. Due to the small size of nanoparticles, technical benefits are possible with less than 1% surface area coverage.

The selection of the coating/powder composition will be dependent on the desired properties and should be considered on a case-by-case basis. Someone skilled in the art of material science or metallurgy will be able to select the appropriate materials for the intended use, based on the information provided in this disclosure. The processing and final product configuration should also be dependent on the desired properties. Someone skilled in the art of material science, metallurgy, and/or mechanical engineering will be able to select the appropriate processing conditions for the desired outcome, based on the information provided in this disclosure.

In some embodiments, at least one nanoparticle is lattice-matched to within ±5% compared to powder feedstock without the nanoparticle. Preferably, the nanoparticle is lattice-matched to within ±2%, more preferably to within ±0.5%, compared to a powder feedstock without the nanoparticle.

In some embodiments, at least one nanoparticle is atomic density-matched to within ±25% compared to a powder feedstock without the nanoparticle. Preferably, the nanoparticle is atomic density-matched to within ±5%, more preferably to within ±0.5%, compared to a powder feedstock without the nanoparticle.

In some embodiments, surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

In general, a functionalization coating may be continuous or discontinuous. The coating may have several characteristic features. In one embodiment, the coating may be smooth and conformal to the underlying surface. In another embodiment, the coating may be nodular. The nodular growth is often characteristic of kinetic limitations of nanoparticle assembly. For example, the coating may look like cauliflower or a small fractal growing from the surface. These features can be affected by the underling materials, the method of coating, reaction conditions, etc.

In some embodiments, microparticles (rather than nanoparticles) coat macroparticles. The macroparticles may include ceramic, metal, polymer, glass, or combinations thereof. The microparticles (coating) may include metal, ceramic, polymer, carbon, or combinations thereof. In the case of microparticles coating macroparticles, functionalization preferably means that the coating particles are of significantly different dimension(s) than the base powder. For example, the microparticles may be characterized by an average dimension (e.g., diameter) that is less than 20%, 10%, 5%, 2%, or 1% of the largest dimension of the macroparticles in the powder.

In some embodiments, the surface functionalization also includes direct chemical or physical modification of the surface of the powder materials, such as to enhance the bonding of the nanoparticles or microparticles. Direct chemical modification of the surface of the powder materials, such as addition of molecules, may also be utilized to affect the solidification behavior of the powder materials. A plurality of surface modifications described herein may be used simultaneously.

Some variations provide a solid metal alloy object or article comprising at least one solid phase (i) containing a nanofunctionalized powdered material as described, or (ii) derived from a liquid form of a nanofunctionalized powdered material as described. The solid phase may form from 0.25 wt % to 100 wt % of the solid object or article. The solid metal alloy object or article may be a geometric object (e.g., wire or rod) that is useful for metal processing, instead of powder feedstock. Powder metallurgy processing techniques include, but are not limited to, hot pressing, low-pressure sintering, extrusion, metal injection molding, and additive manufacturing.

The intermediate or final article may be selected from the group consisting of a sintered structure, a coating, a geometric object, a billet, an ingot, a net-shape part, a near-net-shape part, a welding filler, and combinations thereof. The intermediate or final article may be produced from the coated reactive metal by a process comprising one or more techniques selected from the group consisting of hot pressing, cold pressing, sintering, extrusion, injection molding, additive manufacturing, electron-beam melting, selective laser sintering, pressureless sintering, and combinations thereof.

Some embodiments produce a master alloy from the nanofunctionalized metal powder. A "master alloy" is well-defined in the art and refers to a concentrated alloy source which can be added to a metal being processed, to introduce the appropriate alloying elements into the system. Master alloys are particularly useful when the alloying elements are difficult to disperse or in low weight quantities. In the case of the dispersion difficulties, pre-dispersed master alloys increase wetting and avoid agglomeration. In the case of low quantities, it is much easier to control additions when heavier weights of pre-alloyed material can be added, to avoid weighing errors for the minor alloying elements. The master alloy may ultimately be processed by a variety of operations including, but are not limited to, forging, rolling, extrusion, drawing, sand casting, die casting, investment casting, powder metallurgy, additive manufacturing, or others.

EXAMPLE

An example of the present invention is reduced to practice using a representative hierarchical particle assembly containing aluminum alloy microparticles and zirconium hydride nanoparticles.

Figure 11:
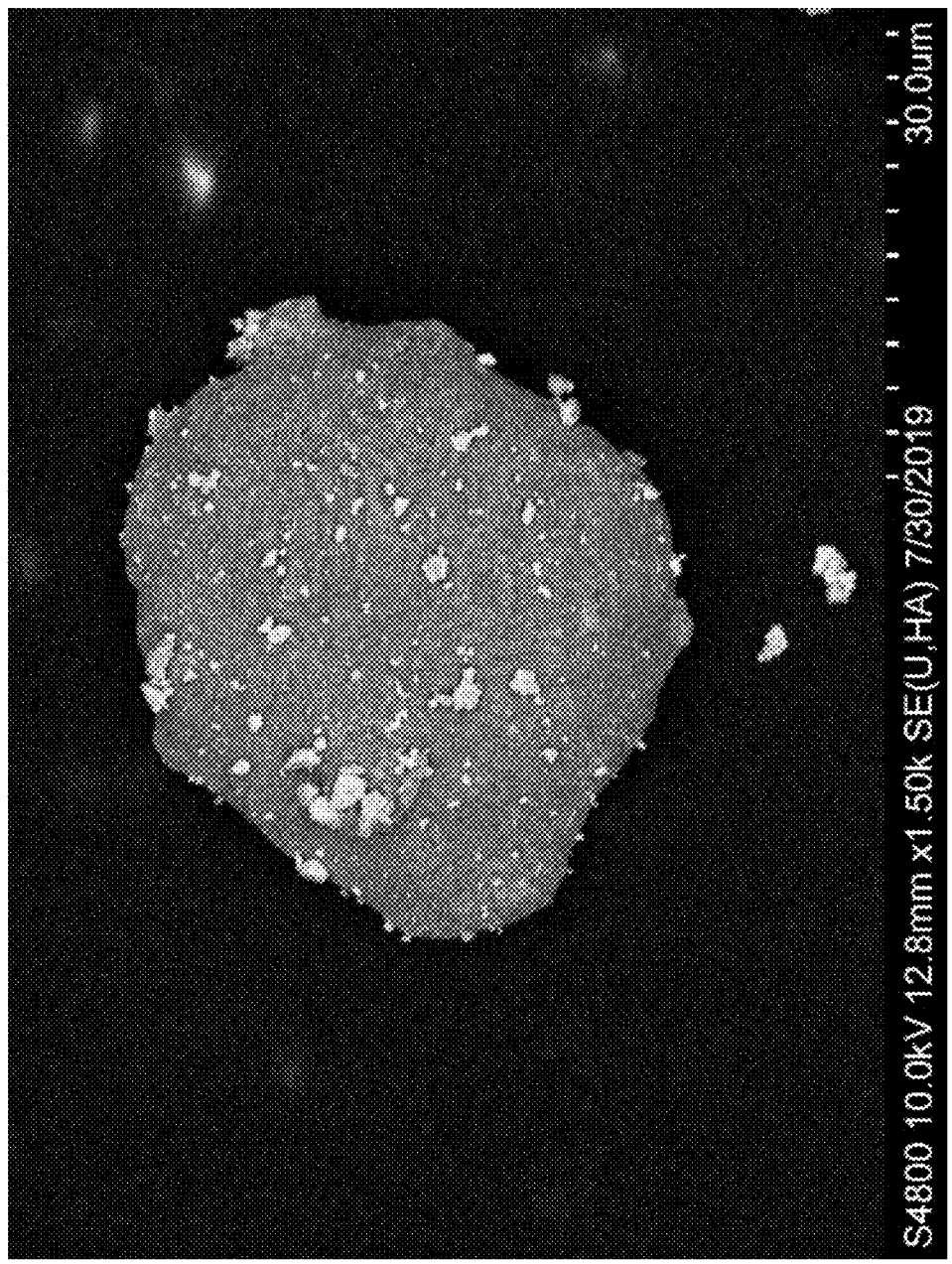
FIG. 11 is a scanning electron microscopy image (scale bar=30 microns) of an exemplary hierarchical powder, in the Example.

For this procedure, pre-alloyed and gas-atomized Al 7034 microparticles with a nominal diameter range between 20 and 300 microns are coated with 1% by volume of $ZrH_2$ nanoparticles with a nominal diameter range between 500 nanometers and 5 microns. The surface functionalization is accomplished using an electrostatic assembly technique to produce a hierarchical powder, which is shown in the scanning electron microscopy (SEM) image of FIG. 11 (scale bar=30 microns).

Figure 6:
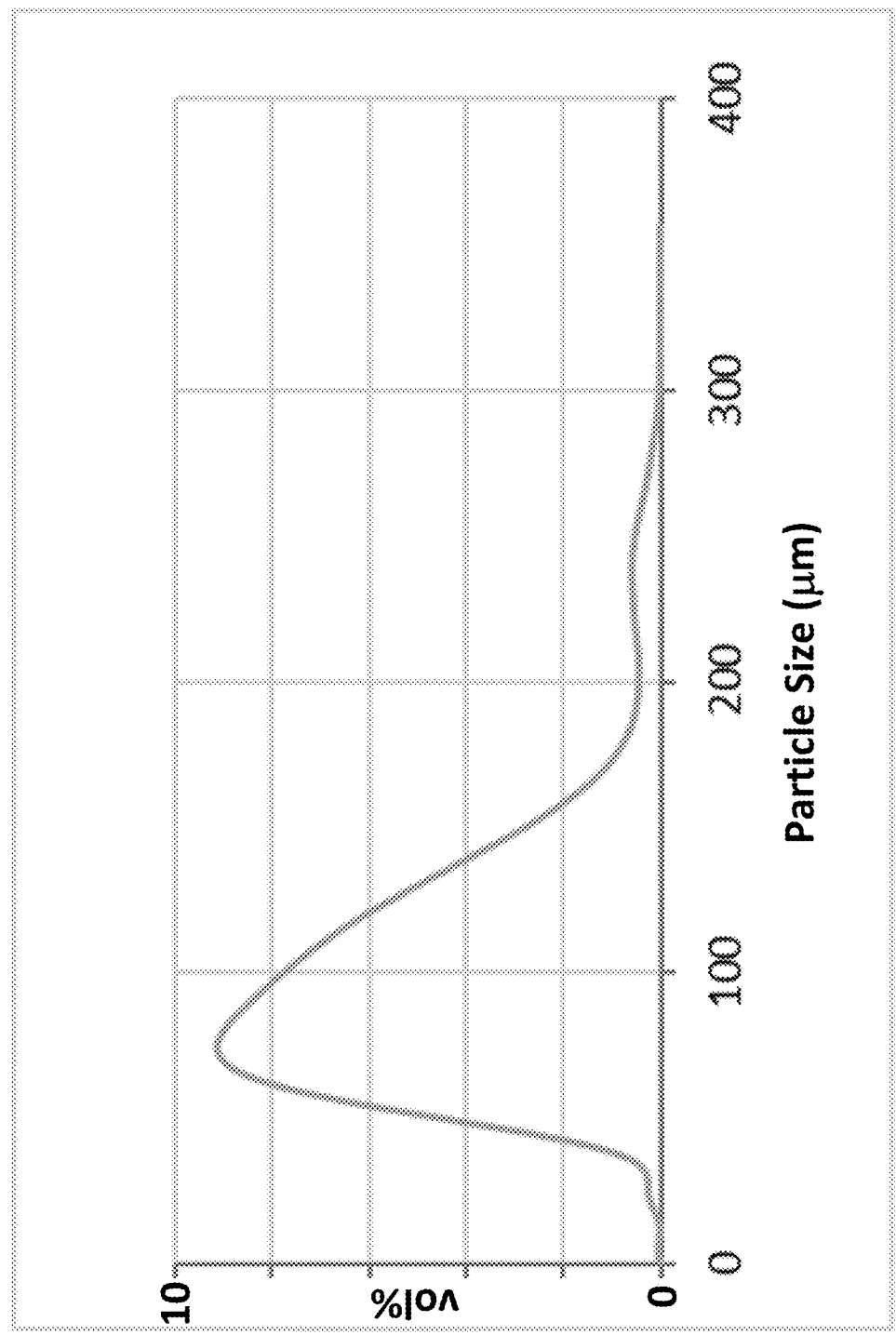
FIG. 6 shows an exemplary particle-size distribution of microparticles with chemically and/or physically attached nanoparticles on surfaces.
Figure 7:
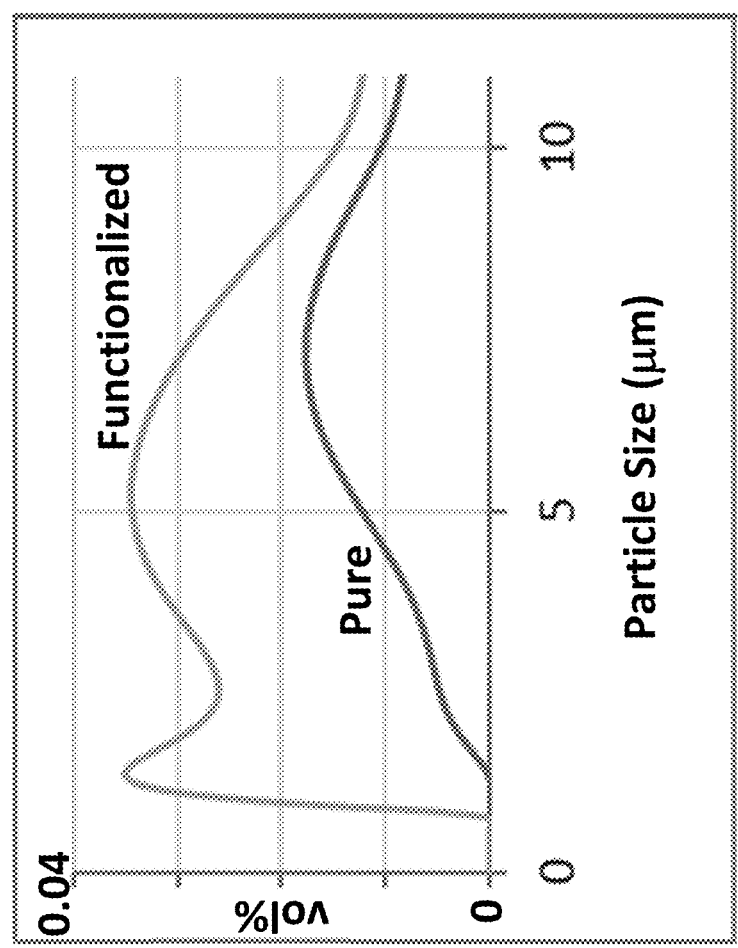
FIG. 7 shows the particle-size distributions of FIGS. 5 and 6, for purposes of determining the amount and/or concentration of free nanoparticles (not on surfaces) within a hierarchical powder.
Figure 8:
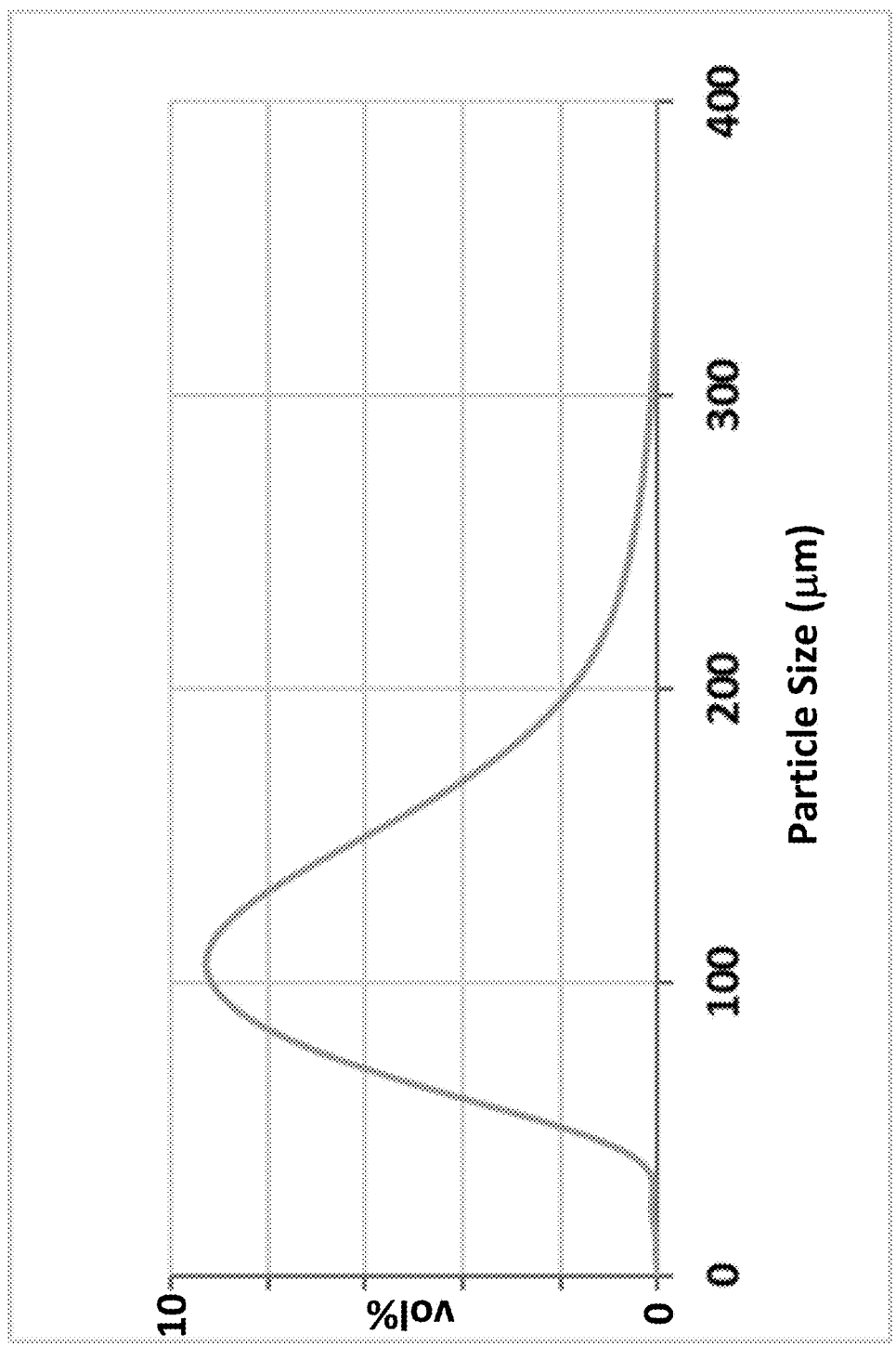
FIG. 8 shows an exemplary particle-size distribution of a hierarchical powder broken down into its individual constituent particles (microparticles and nanoparticles) prior to measurement.
Figure 9:
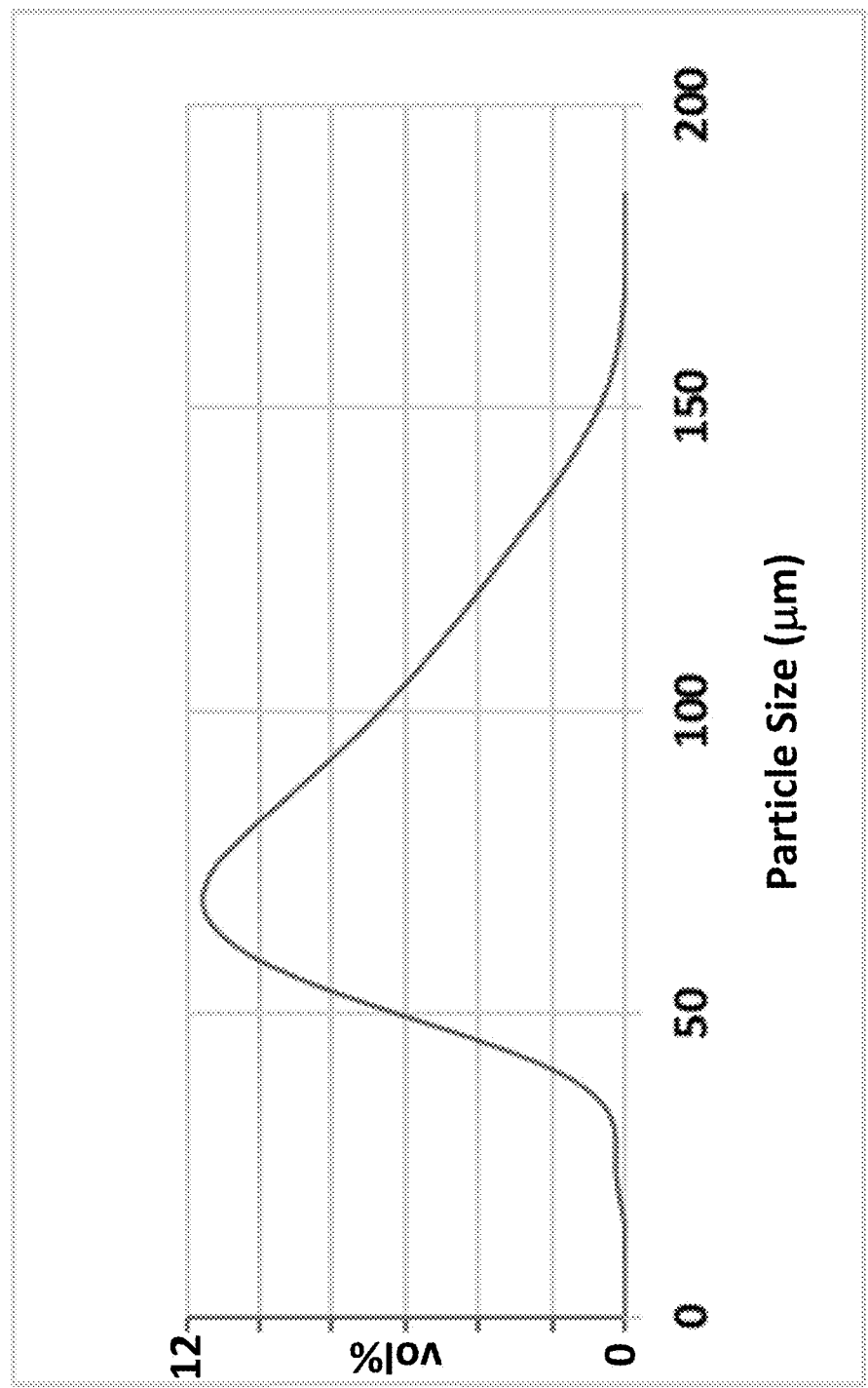
FIG. 9 shows an exemplary additional baseline particle-size distribution of microparticles in fluid media that is different than the gas media for FIG. 5.

Laser-diffraction measurements are performed for both the baseline powder (FIG. 5) and the hierarchical particle assembly (FIG. 6), according to the disclosure herein. FIGS. 5 and 6 are compared to arrive at FIG. 7, to establish residual nanoparticle content.

Subsequently, the hierarchical particle is introduced into a 20-mL solution of 5 mL of isopropyl alcohol (IPA) and 15 mL of a 100 g/L NaCl-deionized water solution. The NaCl salt acts as a charge carrier which introduces electrostatic forces strong enough to separate the $ZrH_2$ nanoparticles from the Al microparticles. The IPA solvent changes the surface tension of the solution, causing the free $ZrH_2$ to congregate above the free Al. The resulting solution contains particle disassemblies, i.e. microparticles and disassembled nanoparticles.

Figure 10:
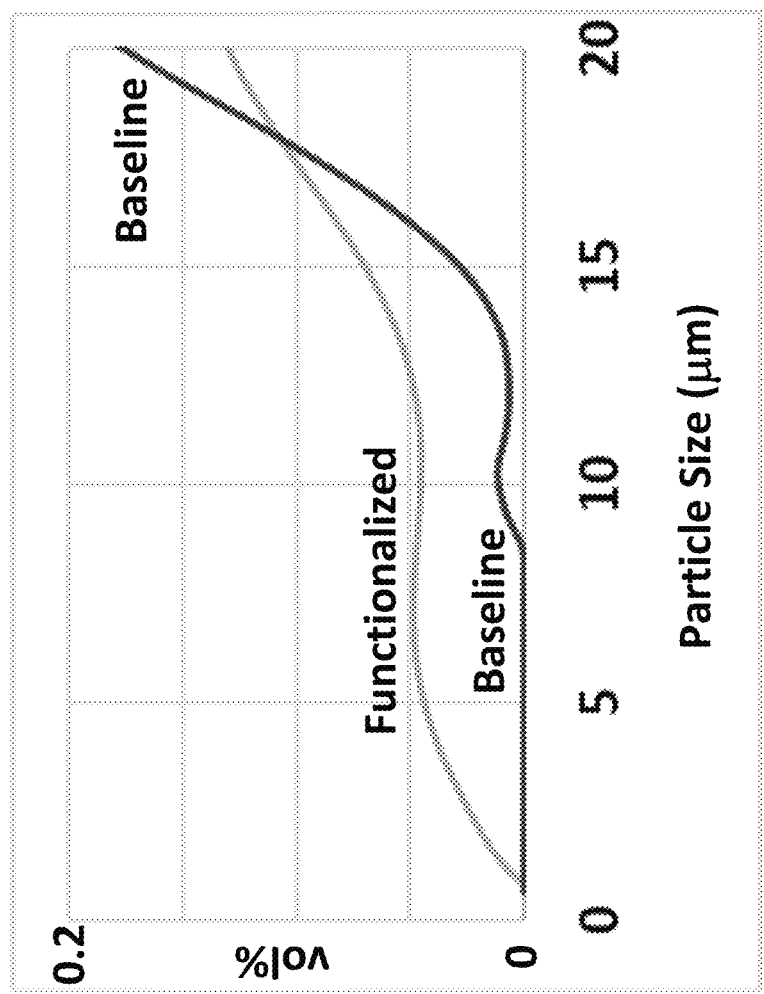
FIG. 10 shows the particle-size distributions of FIGS. 8 and 9, for purposes of determining the amount and/or concentration of original nanoparticles that were on surfaces of microparticles within a hierarchical powder.

The particle disassemblies in solution are then analyzed with a third laser-diffraction measurement (FIG. 8) which is compared to baseline measurements in the same fluid (FIG. 9) to calculate original nanoparticle content on microparticle surfaces (FIG. 10).

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A method for inspecting surface-functionalized microparticles, said method comprising:
    (a) selecting at least one sample of hierarchical particle assemblies comprising microparticles and microparticle-surface-coated nanoparticles, wherein said microparticle-surface-coated nanoparticles are chemically and/or physically attached to said microparticles, and wherein, when surface functionalization is not complete, said sample further comprises free nanoparticles that are not chemically or physically attached to said microparticles;
    (b) obtaining a baseline particle-size measurement of nanoparticle-free microparticles, thereby providing a microparticle particle-size distribution;
    (c) subjecting said hierarchical particle assemblies to a sample particle-size measurement, thereby providing a sample particle-size distribution;
    (d) comparing said sample particle-size measurement to said baseline particle-size measurement;
    (e) if said sample particle-size measurement is statistically equivalent to said baseline particle-size measurement, then providing verification that there is complete surface functionalization due to the absence of said free nanoparticles;
    (f) if said sample particle-size measurement is statistically different than said baseline particle-size measurement, then subtracting said baseline particle-size measurement from said sample particle-size measurement, to calculate a free-nanoparticle particle-size distribution; and
    (g) determining a relative concentration of said free nanoparticles within said sample, based at least on said free-nanoparticle particle-size distribution.

2. The method of claim 1, wherein said sample particle-size measurement and said baseline particle-size measurement utilize a particle-size measurement technique selected from the group consisting of laser diffraction, dynamic light scattering, diffusing wave spectroscopy, static optical imaging, and dynamic optical imaging.

3. The method of claim 2, wherein said particle-size measurement technique is laser diffraction.

4. The method of claim 1, wherein said sample particle-size measurement and said baseline particle-size measurement are conducted in a gas.

5. The method of claim 1, wherein said sample particle-size measurement and said baseline particle-size measurement are conducted in a liquid media.

6. The method of claim 1, wherein a relative concentration of said microparticle-surface-coated nanoparticles is determined by subtracting said relative concentration of said free nanoparticles from a known or estimated concentration of total nanoparticles within said sample, wherein said microparticle-surface-coated nanoparticles are chemically and/or physically attached to said microparticles.

7. The method of claim 1, wherein a relative concentration of said surface-coated nanoparticles is determined by additional steps of:
(h) subjecting said sample to a surface defunctionalization to detach said microparticle-surface-coated nanoparticles from said microparticles, thereby generating disassembled microparticles and disassembled nanoparticles;
(i) subjecting said disassembled microparticles and said disassembled nanoparticles to a disassembled-particle-size measurement, thereby providing a disassembled-particle-size distribution;
(j) subtracting said microparticle particle-size distribution and said free-nanoparticle particle-size distribution from said disassembled-particle-size distribution, to calculate a disassembled-nanoparticle particle-size distribution that characterizes particle sizes of said disassembled nanoparticles; and
(k) determining a relative concentration of said microparticle-surface-coated nanoparticles within said sample, based at least on said disassembled-nanoparticle particle-size distribution obtained in step (j), wherein said microparticle-surface-coated nanoparticles are chemically and/or physically attached to said microparticles.

8. The method of claim 7, wherein in step (h), said surface defunctionalization detaches essentially all of said microparticle-surface-coated nanoparticles from said microparticles.

9. The method of claim 7, wherein in step (h), said surface defunctionalization detaches less than all of said microparticle-surface-coated nanoparticles from said microparticles; and wherein nanoparticle removal efficiency of said surface defunctionalization is known or estimated.

10. The method of claim 7, wherein said surface defunctionalization is carried out in a vapor defunctionalization media.

11. The method of claim 7, wherein said surface defunctionalization is carried out in a liquid defunctionalization media.

12. The method of claim 11, wherein in step (b), said baseline particle-size measurement of nanoparticle-free microparticles is conducted in said liquid defunctionalization media.

13. The method of claim 11, wherein said liquid defunctionalization media contains water, an organic solvent, an inorganic solvent, an ionic liquid, or a combination thereof.

14. The method of claim 13, wherein said liquid defunctionalization media further contains a salt, a surfactant, an organic additive, an inorganic additive, or a combination thereof.

15. The method of claim 7, wherein said surface defunctionalization utilizes agitation, sonication, or a combination thereof.

16. The method of claim 7, wherein said surface defunctionalization utilizes centrifugation, decantation, or a combination thereof.

17. The method of claim 7, wherein said surface defunctionalization utilizes filtration, membrane separation, or a combination thereof.

18. The method of claim 7, wherein said surface defunctionalization is carried out in a liquid defunctionalization media, and wherein said disassembled microparticles and said disassembled nanoparticles are dried for further analysis.

19. The method of claim 1, wherein said at least one sample includes at least two distinct samples from a batch of said hierarchical particle assemblies.

20. The method of claim 1, wherein said at least one sample includes at least three distinct samples from a batch of said hierarchical particle assemblies.

* * * * *